(12) United States Patent
Prabhakar et al.

(10) Patent No.: US 11,510,138 B2
(45) Date of Patent: Nov. 22, 2022

(54) NETWORK SLICE QUOTA MANAGEMENT

(71) Applicant: Apple Inc., Cupertino, CA (US)

(72) Inventors: Alosious Pradeep Prabhakar, Singapore (SG); Vijay Venkataraman, San Jose, CA (US); Krisztian Kiss, Hayward, CA (US); Srinivasan Nimmala, San Jose, CA (US); Longda Xing, San Jose, CA (US); Jordi Agud Ruiz, Meguro-ku (JP)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 17/136,954

(22) Filed: Dec. 29, 2020

(65) Prior Publication Data
US 2021/0211974 A1 Jul. 8, 2021

Related U.S. Application Data

(60) Provisional application No. 62/956,713, filed on Jan. 3, 2020.

(51) Int. Cl.
*H04W 48/18* (2009.01)
*H04W 76/12* (2018.01)
(Continued)

(52) U.S. Cl.
CPC ......... *H04W 48/18* (2013.01); *H04L 41/5009* (2013.01); *H04W 8/24* (2013.01);
(Continued)

(58) Field of Classification Search
CPC ....... H04W 48/18; H04W 8/24; H04W 36/14; H04W 84/04; H04W 76/12; H04L 12/24
(Continued)

(56) References Cited

U.S. PATENT DOCUMENTS

2017/0141973 A1   5/2017   Vrzic
2017/0164212 A1   6/2017   Opsenica et al.
(Continued)

FOREIGN PATENT DOCUMENTS

WO   2018112745 A1   6/2018
WO   2019007486 A1   1/2019

OTHER PUBLICATIONS

Extended European Search Report for EP Application No. 20218027.9-1212, dated May 17, 2021, 15 pages.
(Continued)

*Primary Examiner* — Congvan Tran
(74) *Attorney, Agent, or Firm* — Kowert, Hood, Munyon, Rankin & Goetzel, P.C.

(57) ABSTRACT

Apparatuses, systems, and methods for performing network slice quota management. A network slice quota management function may store capacity information for one or more network slices. The network slice quota management function may receive a request for an indication of whether a network slice has additional capacity. The network slice quota management function may provide an indication of whether the network slice has additional capacity in response to the request. The capacity information may relate to the capacity of the network slice with respect to the number of wireless devices registered for the network slice, or to the capacity of the network slice with respect to the number of packet sessions established with the network slice, or both, among various possibilities.

20 Claims, 16 Drawing Sheets

(51) Int. Cl.
*H04L 41/5009* (2022.01)
*H04W 8/24* (2009.01)
*H04W 36/14* (2009.01)
*H04W 84/04* (2009.01)

(52) U.S. Cl.
CPC .......... *H04W 36/14* (2013.01); *H04W 76/12* (2018.02); *H04W 84/042* (2013.01)

(58) Field of Classification Search
USPC ........................................................ 370/338
See application file for complete search history.

(56) References Cited

U.S. PATENT DOCUMENTS

| | | | |
|---|---|---|---|
| 2018/0317134 A1 | 11/2018 | Leroux et al. | |
| 2020/0092706 A1* | 3/2020 | Kawasaki | H04W 8/02 |
| 2020/0252813 A1* | 8/2020 | Li | H04W 24/08 |
| 2020/0367129 A1* | 11/2020 | Raheem | H04W 36/165 |
| 2021/0058748 A1* | 2/2021 | Liao | H04L 12/189 |

OTHER PUBLICATIONS

Nec et al. "KI#1 Sol#2: Update to Solution #2 Max number of UEs per Network Slice control at registration", vol. SA WG2 Meeting #139E, S2-2004570, Electronic, Elbonia; Jun. 1-12, 2020, 6 pages.
Apple "Solution for Key Issue #2: Support of network slice related quota on maximum number of PDU sessions" vol. SA WG2 Meeting #136-AH, S2-2000934, Incheon, Seoul; Jan. 13-17, 2020, 3 pages.

* cited by examiner

| Service Name | Service Operations | Operation Semantic | Known Consumer(s) |
|---|---|---|---|
| Nnsqm_RegistrationCount | UECheck | Request/Response | AMF, NSSF |
| | UEAddition | | |
| | UERemoval | | |
| | Subscribe | Subscribe/Notify | AMF, NSSF |
| | Unsubscribe | | |
| | Notify | | |
| Nnsqm_PDUCount | AvailabilityCheck | Request/Response | AMF, NSSF |
| | Modification | | |
| | Subscribe | Subscribe/Notify | AMF, NSSF |
| | Unsubscribe | | |
| | Notify | | |

FIG. 16

| Service Name | Service Operations | Operation Semantic | Known Consumer(s) |
|---|---|---|---|
| Namf_Communication | UEContextRelease | Request/Response | NG-RAN |

FIG. 17

NETWORK SLICE QUOTA MANAGEMENT

PRIORITY INFORMATION

This application claims priority to U.S. provisional patent application Ser. No. 62/956,713, entitled "Network Slice Quota Management," filed Jan. 3, 2020, which is hereby incorporated by reference in its entirety as though fully and completely set forth herein.

FIELD

The present application relates to wireless devices, and more particularly to apparatus, systems, and methods for performing network slice quota management in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for performing network slice quota management in a wireless communication system.

The network slice quota management may be supported by the deployment of a network slice quota management function as a cellular network element in a cellular core network. The network slice quota management function may store and track capacity information for one or more network slices in the cellular network. The capacity information may relate to the capacity of each of the network slices with respect to any of various possible characteristics, such as the number of wireless devices registered for each network slice, the number of packet sessions established for each network slice, etc. For example, the capacity information could include information indicating the number of wireless devices allowed to be registered for each network slice and the number of wireless devices currently registered for each network slice, the number of packet sessions allowed to be established for each network slice and the number of packet sessions currently established for each network slice, and/or any of various other possible information.

The capacity information maintained by the network slice quota management function may be accessible by one or more other network functions or elements in the cellular network, e.g., to facilitate determination of whether to accept new wireless device registration requests or packet session establishment requests for a given network slice. For example, an access and management function that receives a request from a wireless device to register with a network slice or to establish a packet session with the network slice could send a request to the network slice quota management function for an indication of whether the network slice has capacity for the requested service. The network slice quota management function may respond accordingly, which may in turn enable the access and management function to determine whether accepting the registration request or packet session establishment request would violate the capacity of the corresponding network slice.

Thus, the deployment and use of such a network slice quota management function may help support the possibility of introducing one or more quotas on the (e.g., maximum) capacity of a network slice with respect to any of various possible characteristics, such as the number of wireless devices that can be simultaneously registered with a network slice, the number of packet sessions that can be simultaneously established with a network slice, etc. Such a quota management approach may allow for different quotas to be defined for different network slices and/or for different types of network slice capacity, among various possibilities, at least according to some embodiments.

The techniques described herein may be implemented in and/or used with a number of different types of devices, including but not limited to cellular phones, tablet computers, wearable computing devices, portable media players, unmanned aerial vehicles, unmanned aerial controllers, automobiles and/or motorized vehicles, network infrastructure equipment, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 16 is a table illustrating possible services that could be provided by a network slice quota management function, according to some embodiments; and FIG. 17 is a table illustrating a possible service that could be provided by an access and management function in conjunction with use of a network slice quota management function in a cellular network, according to some embodiments.

Figure 1:
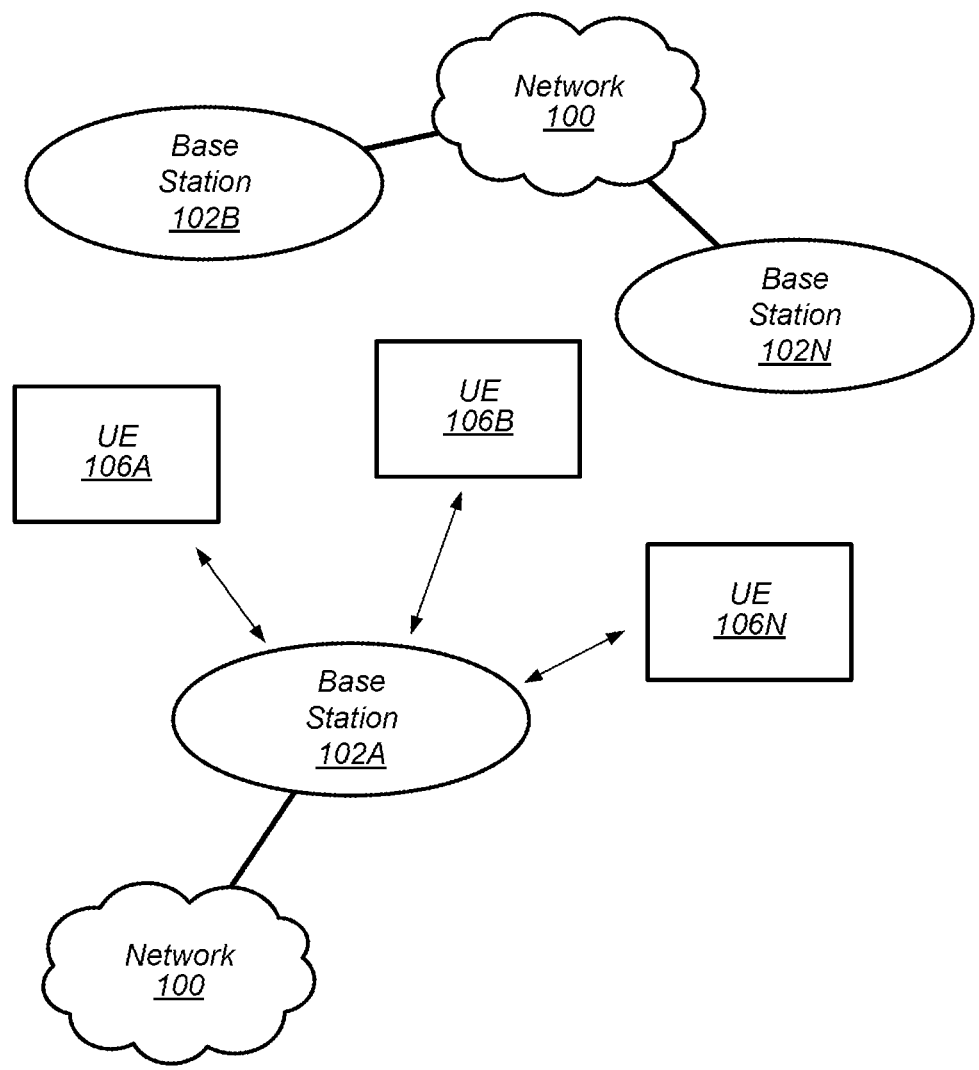
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
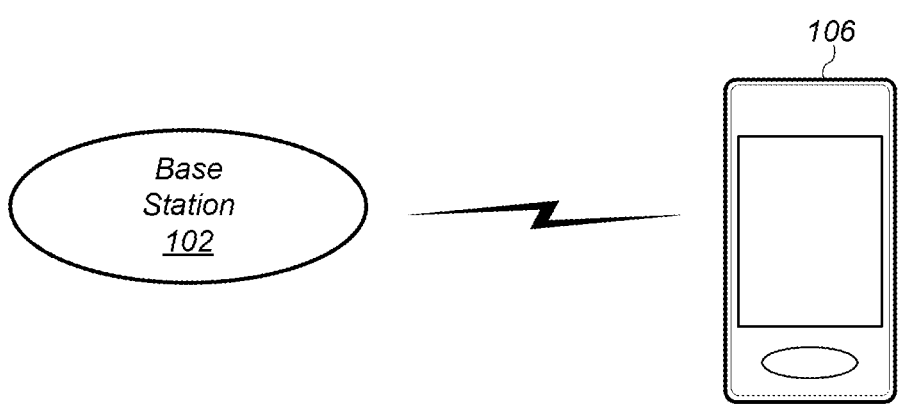
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, an unmanned aerial vehicle (UAV), an unmanned aerial controller (UAC), an automobile, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
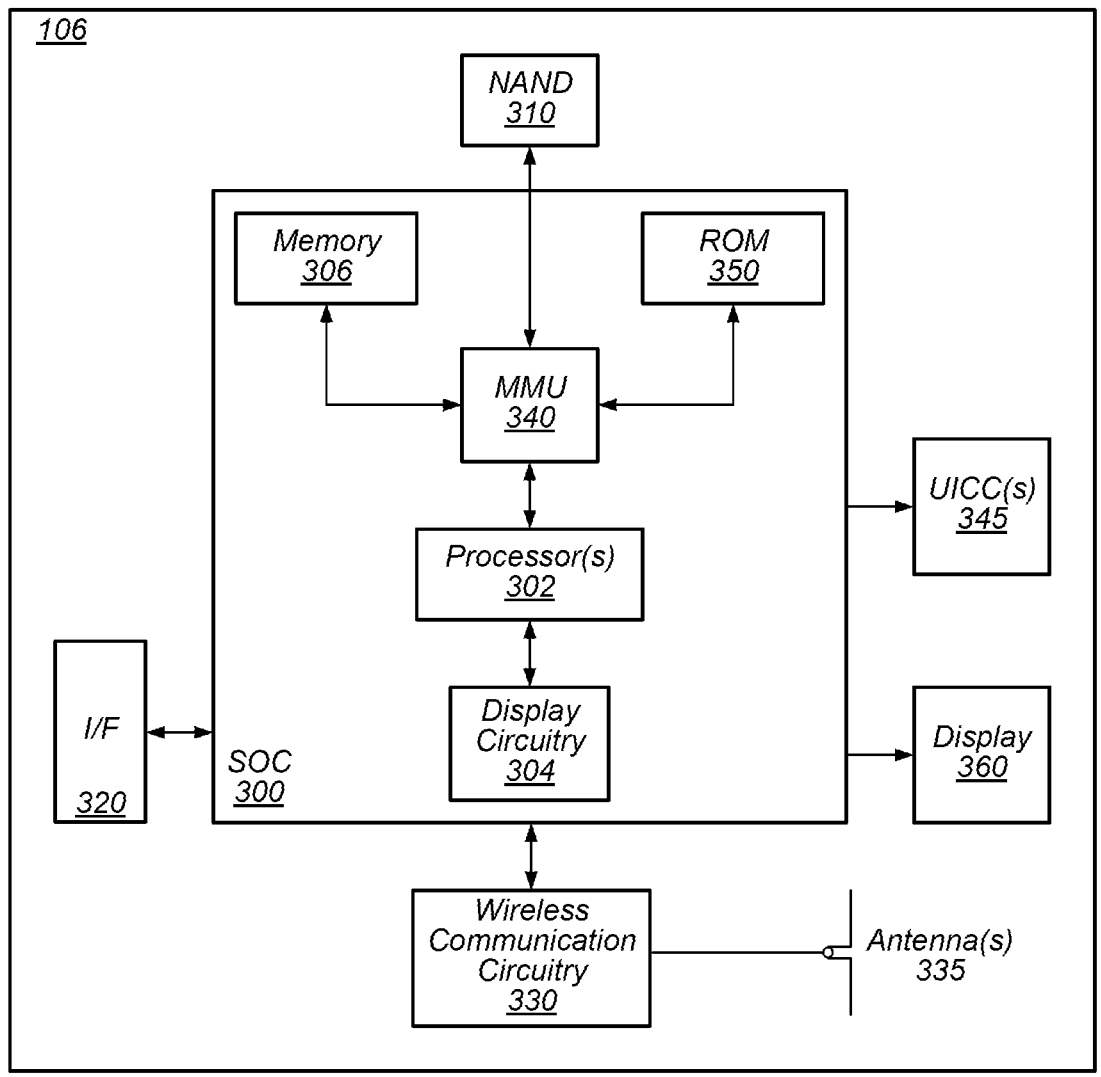
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
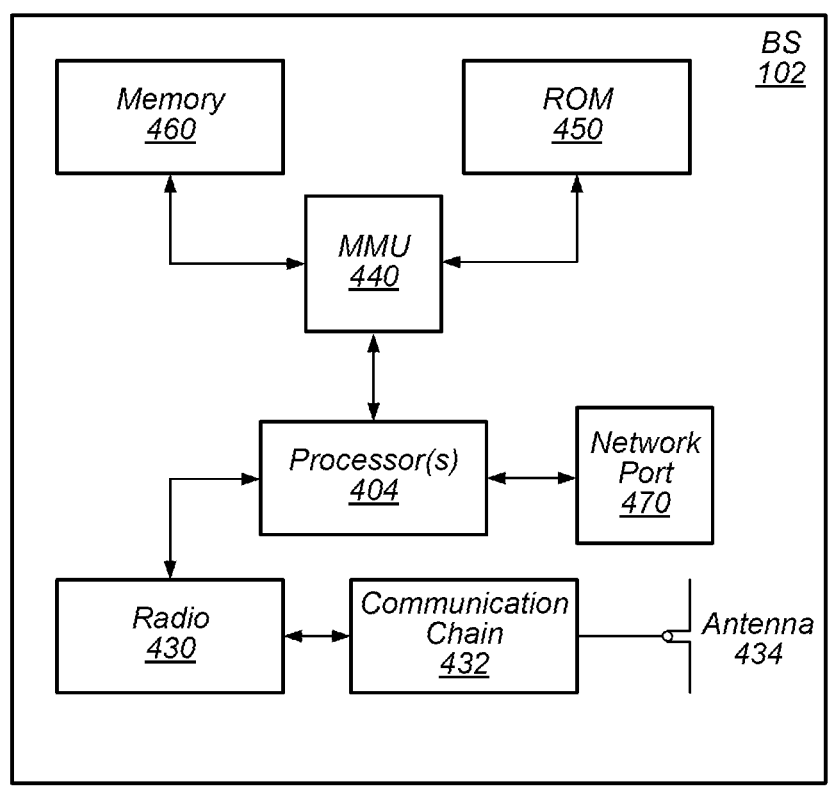
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
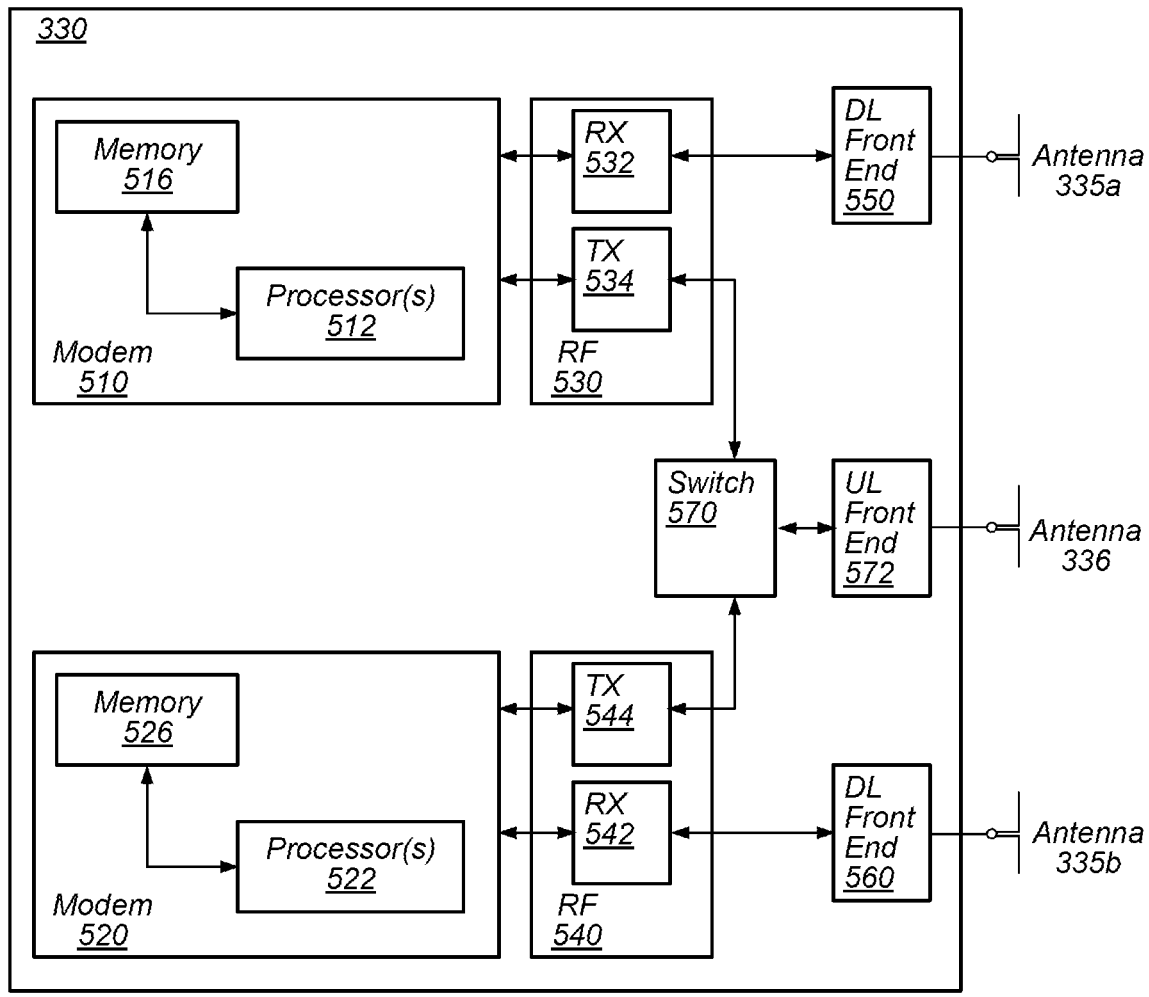
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
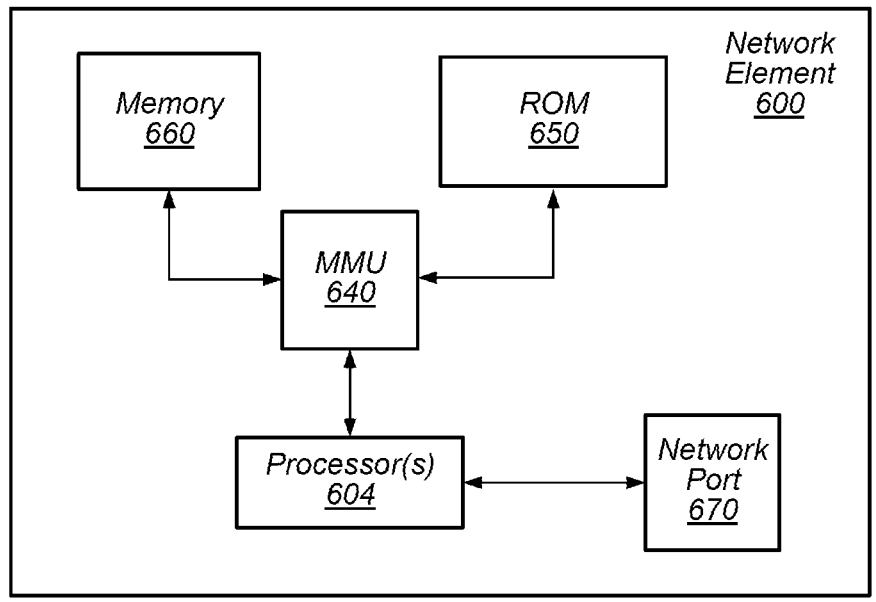
FIG. 6 illustrates an example block diagram of a network element, according to some embodiments.

FIG. 6—Exemplary Block Diagram of a Network Element

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
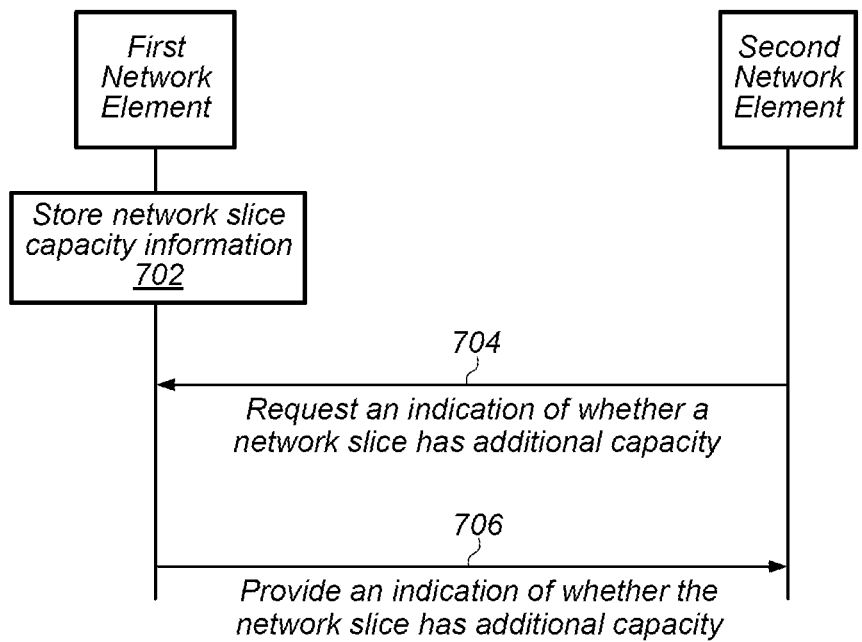
FIG. 7 is a flowchart diagram illustrating an example method for performing network slice quota management in a wireless communication system; according to some embodiments.

FIG. 7—Network Slice Quota Management

New cellular communication techniques are continually under development, to increase coverage, to better serve the range of demands and use cases, and for a variety of other reasons. As new cellular communication technologies are developed and deployed, certain features may be included that are new or differ from previously developed and deployed cellular communication technologies.

One approach to a cellular network architecture may include use of various network slices to provide various services to users of the cellular network. This approach may enable a cellular network operator to virtually adapt its network infrastructure to provide a set of applications and services to users in a flexible and efficient manner, at least according to some embodiments. In order to support such adaptability in network slices deployed within a cellular network, it may be useful to provide a mechanism to configure and operate within a specified capacity for each network slice, e.g., with respect to any of a variety of possible characteristics or parameters.

Accordingly, FIG. 7 is a signal flow diagram illustrating an example of a method for performing network slice quota management in a wireless communication system, at least according to some embodiments. Aspects of the method of FIG. 7 may be implemented by a wireless device such as a UE 106 illustrated in various of the Figures herein, a base station such as a BS 102 illustrated in various of the Figures herein, a network element such as a NSQM function, AMF, or SMF, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

In 702, a first cellular network element may store capacity information for one or more network slices. The first cellular network element may include a network slice quota management (NSQM) function, at least according to some embodiments. For simplicity, the first network element may be referred to subsequently herein as the NSQM function; it should, however, be noted that the functionality of the first network element could alternatively be implemented by any of various other possible cellular network elements, at least according to some embodiments. For example, according to various embodiments, the NSQM functionality could be provided as part of a cellular network element that also implements one or more other network functions, such as an AMF, SMF, NRF, PCF, NSSF, etc. In other words, in some instances, it may be possible for another existing network element to provide NSQM functionality, e.g., in addition to its existing functions.

The capacity information may include a current number of wireless devices registered, and a number of wireless devices allowed to be registered, for each network slice for which the NSQM function stores capacity information. Additionally, or alternatively, the capacity information may include a current number of active packet sessions, a current number of dormant packet sessions, and a number of packet sessions allowed, for each network slice for which the NSQM function stores capacity information. Note that, at least according to some embodiments, active packet sessions may include packet sessions for which a radio connection is active (e.g., if a wireless device is in RRC connected mode), while dormant packet sessions may include packet sessions for which a radio connection is inactive (e.g., if a wireless device is in RRC inactive or RRC idle mode). Any of various other parameters relating to the network slice capacity for each network slice for which the NSQM function stores capacity information may additionally or alternatively be included in the capacity information, according to various embodiments.

In 704, a second cellular network element may provide a request to the NSQM function for an indication of whether a network slice has additional capacity. According to some embodiments, the second cellular network element may be an access and management function (AMF). For simplicity, the second network element may be referred to subsequently herein as the AMF; it should, however, be noted that the functionality of the second network element could alternatively be implemented by any of various other possible cellular network elements, at least according to some embodiments. Note that in some instances, it could be possible that the AMF and the NSQM are provided by the same cellular network element, in which case the request may be provided from the AMF implemented by the cellular network to the NSQM implemented by the same cellular network element, at least according to some embodiments.

In some instances, the AMF may provide a request for the address of the NSQM function to another network element, such as a network function repository function (NRF), e.g., in order to obtain the address of the NSQM function, prior to providing the request for an indication of whether the network slice has additional capacity. In such a scenario, the NRF may respond with an indication of the address of the NSQM function, e.g., within the cellular network, which may be received by the AMF.

The request for an indication of whether a network slice has additional capacity may specify with respect to which of various possible parameters an indication of whether the network slice has additional capacity is requested. For example, the request could be a request for an indication of whether the network slice has capacity for an additional wireless device to register with the network slice, or could be a request for an indication of whether the network slice has capacity for an additional packet session to be established with the network slice. Further, it should be noted that, at least according to some embodiments, it may be possible for a request to be provided to the NSQM function with respect to whether additional capacity is available for multiple parameters and/or multiple network slices.

At least in some instances, the request for an indication of whether the network slice has additional capacity may be provided in response to a request (or multiple requests) from a wireless device (or from multiple wireless devices) to register with the network slice or to establish a packet session with the network slice (and possibly with one or more other network slices).

In 706, the NSQM function may provide an indication of whether the network slice has additional capacity in response to the request by the AMF. Thus, as an example, if the request for an indication of whether the network slice has additional capacity includes a request for an indication of whether the network slice has capacity for an additional wireless device to register with the network slice, the response may indicate that the network slice has capacity for an additional wireless device to register with the network slice if the capacity information indicates that the number of wireless devices registered with the network slice is less than the number of wireless devices allowed to be registered with the network slice. In contrast, if the capacity information indicates that the number of wireless devices registered with the network slice is at least equal to the number of wireless devices allowed to be registered with the network slice, the response may indicate that the network slice does not have capacity for an additional wireless device to register with the network slice.

As another example, at least according to some embodiments, if the request for an indication of whether the network slice has additional capacity includes a request for an indication of whether the network slice has capacity for an additional packet session to be established with the network slice, the response may indicate that the network slice has capacity for an additional packet session to be established with the network slice if the capacity information indicates that the number of packet sessions established with the network slice is less than the number of packet sessions allowed to be established with the network slice. In contrast, if the capacity information indicates that the number of packet sessions allowed to be established with the network slice is at least equal to the number of packet sessions allowed to be established with the network slice, the response may indicate that the network slice does not have capacity for an additional packet session to be established with the network slice.

At least in some embodiments, if the indication of whether the network slice has additional capacity indicates that the network slice does have additional capacity with respect to the requested parameter(s), the AMF may accept the request from the wireless device to register with the network slice or to establish a packet session with the network slice. Note that such a decision may further be based on or otherwise conditional upon one or more other considerations, such as whether the wireless device subscription supports registration with the network slice, among various other possibilities, at least according to some embodiments.

If the indication of whether the network slice has additional capacity indicates that the network slice does not have additional capacity with respect to the requested parameter(s), it may be the case that the AMF rejects the request from the wireless device to register with the network slice or to establish a packet session with the network slice, possibly including providing cause code information to the wireless device.

Alternatively, if the wireless device requested to establish a packet session with the network slice, it may be the case that the indication of whether the network slice has additional capacity indicates that the network slice does not have capacity for an additional packet session to be established with the network slice, but may also indicate that the network slice has at least one dormant packet session. In such a scenario, the AMF may release a dormant packet session with the network slice (e.g., based at least in part on the request from the wireless device to establish a packet session with the network slice and the indication that the network slice does not have capacity for an additional packet session to be established with the network slice), and may accept the request from the wireless device to establish a packet session with the network slice (e.g., based at least in part on releasing the dormant packet session with the network slice). If the AMF does release a dormant packet session with the network slice, such release may be performed in a "proactive" manner, in which case the wireless device with the dormant packet session may be immediately informed that the dormant packet session has been released, as one possibility. As another possibility, such release may be performed in a "deferred" manner, in which case the wireless device with the dormant packet session may not be informed that the dormant packet session has been released until it attempts to resume the dormant packet session.

In some embodiments, the AMF (and/or one or more other cellular network elements, such as a session management function (SMF)) may provide updates to the NSQM function to facilitate accurate tracking of the capacity information for the various network slices for which the NSQM function maintains capacity information. For example, an indication could be provided to the NSQM function when a wireless device has registered (or deregistered) for a network slice, based on which the NSQM function may increment (or decrement) the capacity information indicating the current number of wireless devices registered for that network slice. As another example, an indication could be provided to the NSQM function when the number of active packet sessions for a network slice changes, and/or when the number of dormant packet sessions for a network slice changes, based on which the NSQM function may modify the capacity information indicating the current number of active and/or dormant packet sessions established with the network slice. Any of various other indications to modify the capacity information for a network slice may similarly be provided, as desired, based on which the NSQM function may accordingly modify the capacity information for the indicated network slice.

Note that, at least according to some embodiments, the NSQM function may check whether an indication of a wireless device registration or packet session actually represents a new wireless device registration or packet session before incrementing (or otherwise modifying) its capacity information. For example, there could be instances in which a wireless device has registered to a network slice via one AMF, but due to wireless device mobility, performs a mobility registration update via another AMF. In such a scenario, the NSQM function may implement one or more duplicate detection techniques, e.g., to determine whether a wireless device is already counted in its count of wireless devices registered for a network slice, and may determine whether to modify the current number of wireless devices registered for the network slice based at least in part on whether the wireless device registration is a "duplicate" registration. The NSQM function could also or alternatively implement such an approach to determine whether a (e.g., active or dormant) packet session is already counted in its count of packet sessions established for a network slice, and may determine whether to modify the current number of packet sessions established for the network slice based at least in part on whether the packet session is a "duplicate" session.

Thus, the method of FIG. 7 may be used to support network slice quota management when a network slicing approach is applied to a cellular network architecture, at least according to some embodiments. As described herein, such quota management techniques may be particularly helpful in ensuring that use of a network slice remains within the physical capacity of the hardware and/or software used to provide the network slice, and/or in at least some scenarios in which it may be desirable to implement a quota on network slice capacity that may differ from the physical capacity of the hardware and/or software used to provide the network slice, among various possible scenarios.

FIGS. 8-17 and Additional Information

FIGS. 8-17 illustrate further aspects that might be used in conjunction with the method of FIG. 7 if desired. It should be noted, however, that the exemplary details illustrated in and described with respect to FIGS. 8-17 are not intended to be limiting to the disclosure as a whole: numerous variations and alternatives to the details provided herein below are possible and should be considered within the scope of the disclosure.

As previously noted, network slicing may be used to serve users of a cellular network in an adaptive, flexible manner, at least according to some embodiments. Part of such adaptability and flexibility may include the ability to scale different network slices to a variety of possible sizes, e.g., to support different sized user bases for different services and applications, and/or for any of a variety of other reasons. Providing a mechanism to configure and enforce quotas with respect to various capability parameters of each of the network slices deployed in a network may be one important aspect of supporting such adaptive scalability, at least according to some embodiments.

As one possible input or attribute that may be considered when determining to what size to scale a network slice, a number of terminals (e.g., UEs) that are allowed to use a network slice simultaneously could be defined. For example, there may be a significant difference in the scale of a network slice that is used to serve 10 users simultaneously compared to the scale of a network slice that is used to serve 1,000,000 users simultaneously.

Accordingly, a key issue with respect to supporting network slicing may include determining how to support a certain quota on the (e.g., maximum) number of UEs allowed to concurrently register for a network slice (e.g., as defined by a single network slice selection assistance information (S-NSSAI)).

Figure 8:
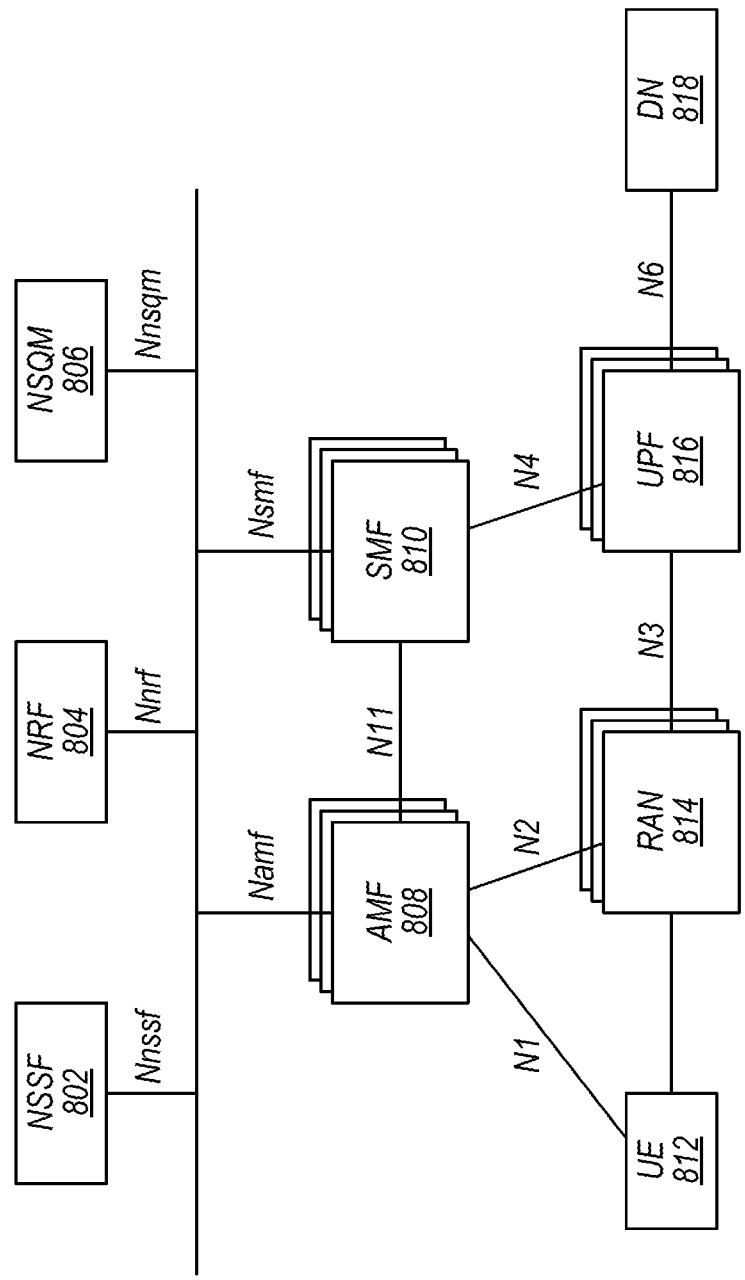
FIG. 8 illustrates aspects of an exemplary possible cellular network architecture including a network slice quota management function, according to some embodiments.

One possibility may include providing a network slice quota management (NSQM) function within a cellular network to maintain a count of the number of registered UEs in a S-NSSAI. FIG. 8 illustrates aspects of one possible cellular core network architecture including such a NSQM function 806, according to some embodiments. As shown, the cellular core network may also include a network slice selection function (NSSF) 802, a network function repository function (NRF) 804, one or more access and management functions (AMFs) 808, and one or more session management functions (SMFs) 810. The cellular network may be accessible to a UE 812 (among other possible wireless devices) via one or more radio access networks (RANs) 814, and may also provide access to one or more data networks (DNs) 818 via one or more user plane functions (UPFs) 816. Note that the cellular network architecture illustrated in FIG. 8 is provided by way of example only, and that numerous other cellular network architectures (and/or variations on the illustrated cellular network architecture) are also possible.

Figure 9:
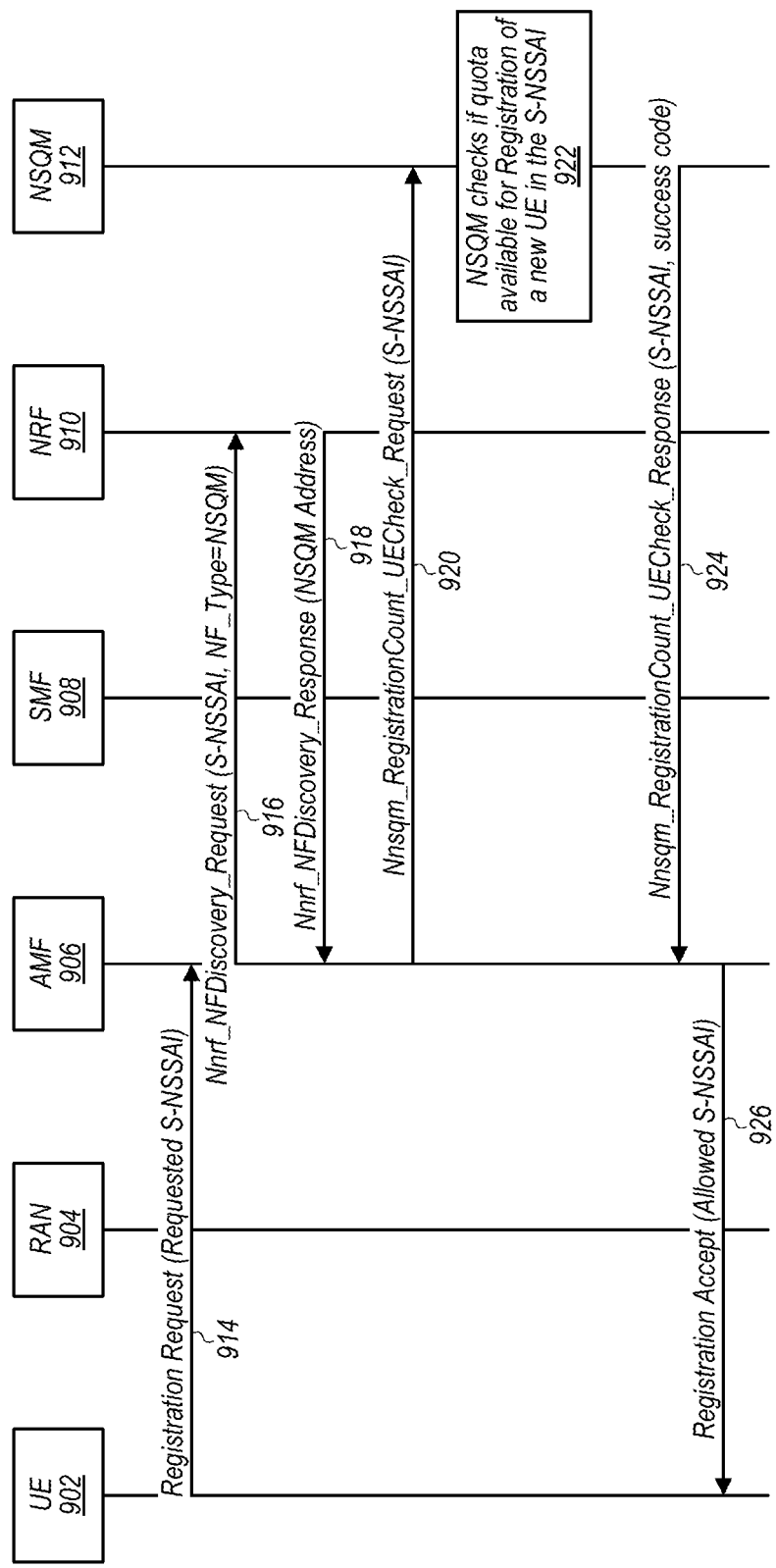
FIG. 9 is a communication flow diagram illustrating possible signaling that could be used in a successful registration scenario when a quota on registered UEs for a network slice is enforced by a network slice quota management function, according to some embodiments.

The NSQM function may keep a count of the number of UEs registered and deregistered for a network slice (and possibly multiple network slices), and may provide various services to the other cellular network elements based at least in part on this information. As an example of such tracking and service provision, FIG. 9 is a communication flow diagram illustrating possible signaling that could be used in a successful registration scenario when a quota on registered UEs for a network slice is enforced by a network slice quota management function, according to some embodiments.

As shown, the communication flow may be performed between a UE 902, a RAN 904, an AMF 906, a SMF 908, a NRF 910, and a NSQM 912. In 914, the UE 902 may send a registration request (e.g., indicating a requested S-NSSAI) to the AMF 906, via the RAN 904. In 916, the AMF 906 may send a network function discovery request to the NRF 910 to request the address of the NSQM 912 for the requested S-NSSAI. In 918, the NRF 910 may provide a network function discovery response to the AMF 906, including the address of the NSQM 912. In 920, the AMF 906 may request a UE registration count for the requested S-NSSAI from the NSQM 912, e.g., to determine whether there is available quota for registered UEs for that particular S-NSSAI. In 922, the NSQM 912 may check whether quota is available for registration of a new UE in the specified S-NSSAI. In the scenario of FIG. 9, it may be the case that there is quota available for registration of a new UE in the specified S-NSSAI, and so in 924, the NSQM 912 may respond to the request for a UE registration count for the specified S-NSSAI with a success code for the S-NSSAI. The AMF 906 may also check the subscription of the UE 902 with a network slice selection function, which may confirm the subscription of the UE 902 in the illustrated scenario. In 926, the AMF 906 may respond to the registration request of the UE 902 with a registration accept message, with the specified S-NSSAI added to the "Allowed S-NSSAI" list. Note that the AMF 906 may also inform the NSQM 912 that a new UE is registered in the network for the specified network slice.

Figure 10:
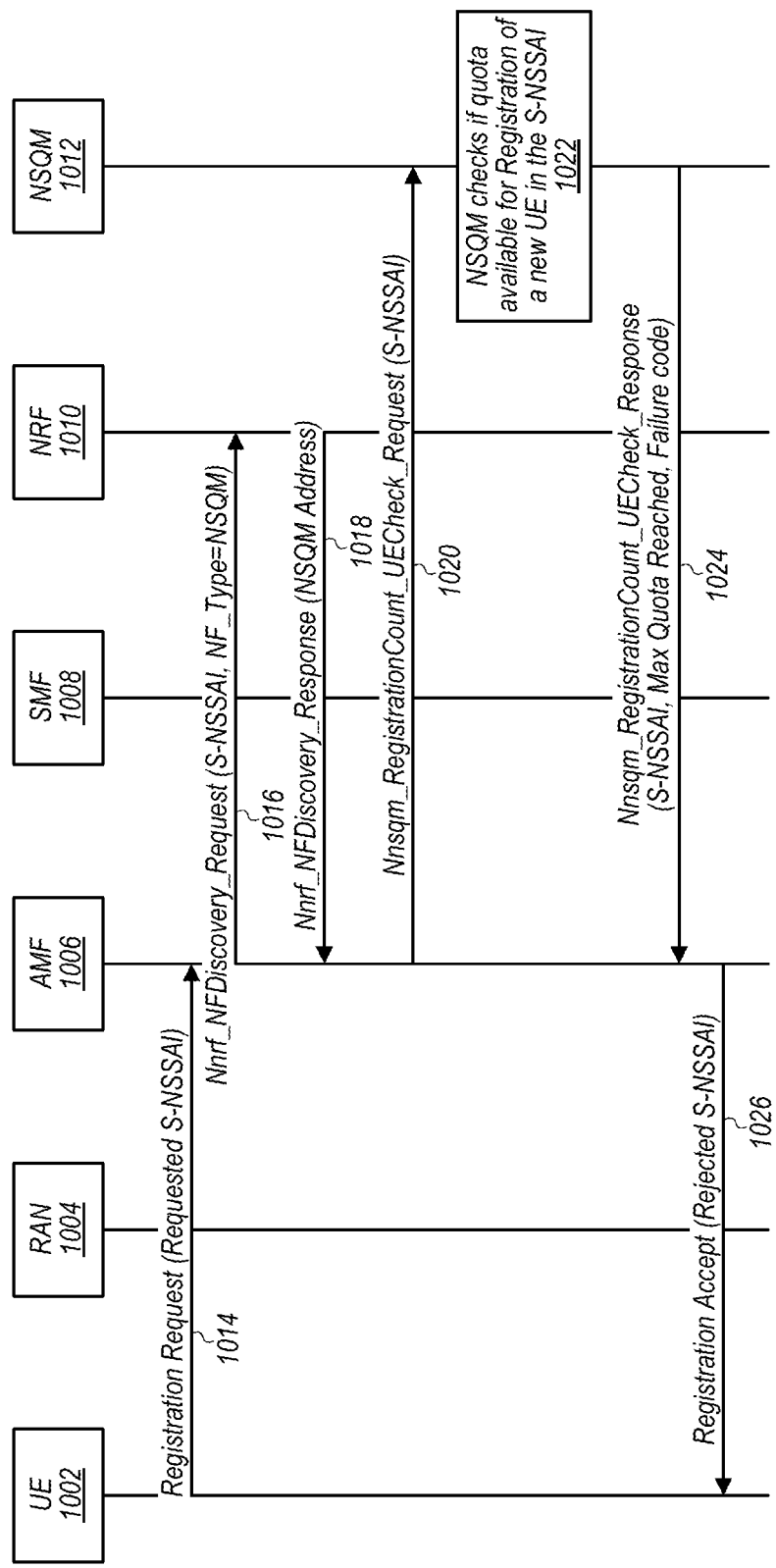
FIG. 10 is a communication flow diagram illustrating possible signaling that could be used in a rejected registration scenario when a quota on registered UEs for a network slice is enforced by a network slice quota management function, according to some embodiments.

As another example of such tracking and service provision, FIG. 10 is a communication flow diagram illustrating possible signaling that could be used in a rejected registration scenario when a quota on registered UEs for a network slice is enforced by a network slice quota management function, according to some embodiments. As shown, the communication flow may be performed between a UE 1002, a RAN 1004, an AMF 1006, a SMF 1008, a NRF 1010, and a NSQM 1012. In 1014, the UE 1002 may send a registration request (e.g., indicating a requested S-NSSAI) to the AMF 1006, via the RAN 1004. In 1016, the AMF 1006 may send a network function discovery request to the NRF 1010 to request the address of the NSQM 1012 for the requested S-NSSAI. In 1018, the NRF 1010 may provide a network function discovery response to the AMF 1006, including the address of the NSQM 1012. In 1020, the AMF 1006 may request a UE registration count for the requested S-NSSAI from the NSQM 1012, e.g., to determine whether there is available quota for registered UEs for that particular S-NSSAI. In 1022, the NSQM 1012 may check whether quota is available for registration of a new UE in the specified S-NSSAI. In the scenario of FIG. 10, it may be the case that there is not quota available for registration of a new UE in the specified S-NSSAI, and so in 1024, the NSQM 1012 may respond to the request for a UE registration count for the specified S-NSSAI with a failure code for the S-NSSAI, indicating that the maximum quota on registered UEs has been reached for the S-NSSAI. In 1026, the AMF 1006 may respond to the registration request of the UE 1002 with a registration accept message, with the specified S-NSSAI added to the "Rejected S-NSSAI" list.

Note that in a scenario in which a UE sends registration requests for multiple S-NSSAIs, and in which an AMF in turn provides inquires regarding the available quota for registered UEs for multiple S-NSSAIs, it could also be the case that the NSQM function indicates that there is available quota for registered UEs for one or more S-NSSAIs, and also that there is not available quota for registered UEs for one or more S-NSSAIs. In such a scenario, the AMF may respond to the registration request of the UE with a registration accept message, with the S-NSSAI(s) for which quota for registered UEs is available added to the "Allowed S-NSSAI" list and the S-NSSAI(s) for which quota for registered UEs is not available added to the "Rejected S-NSSAI" list.

Figure 11:
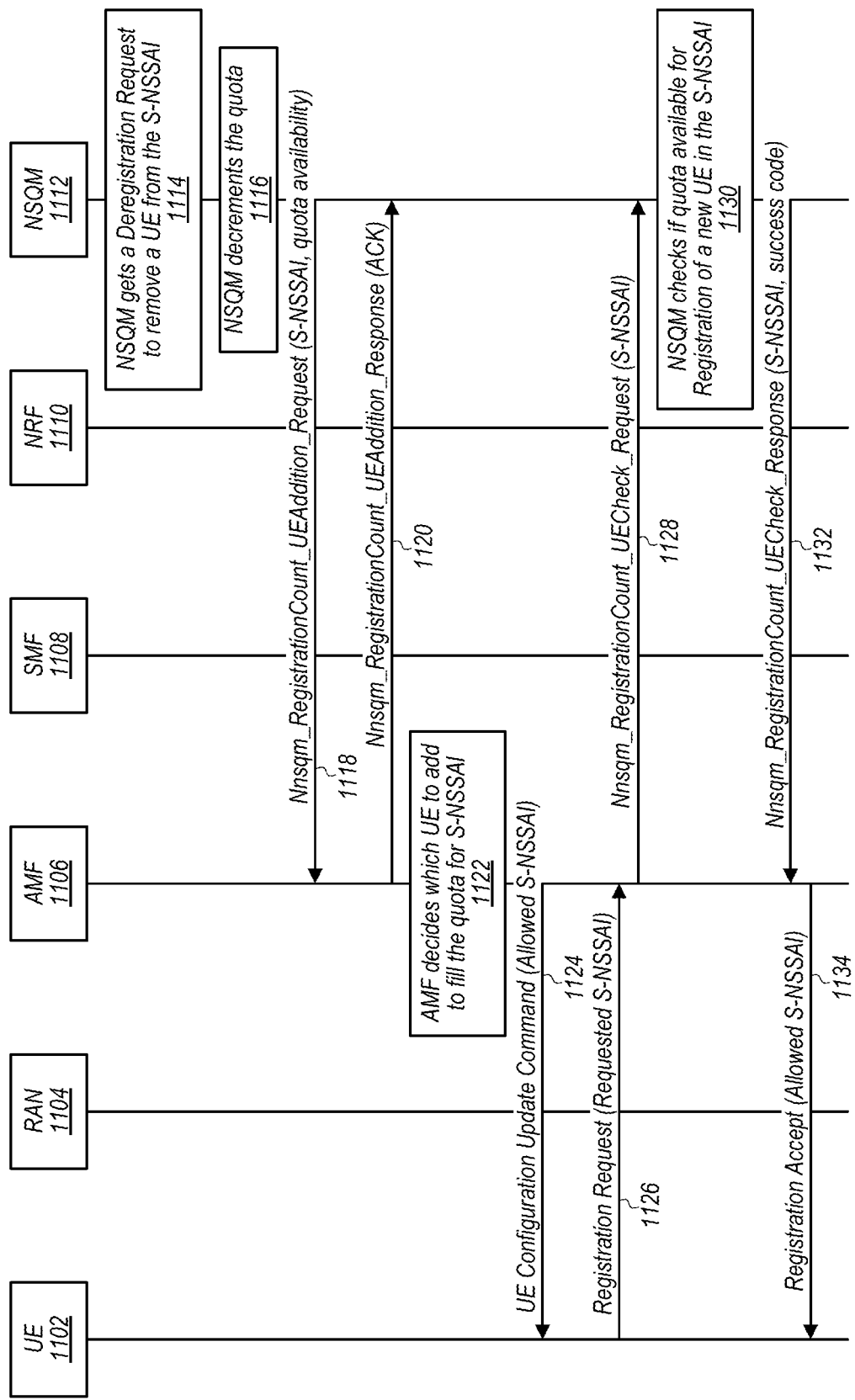
FIG. 11 is a communication flow diagram illustrating possible signaling that could be used in a scenario in which a previously rejected registration is allowed due to a UE deregistration when a quota on registered UEs for a network slice is enforced by a network slice quota management function, according to some embodiments.

It may also be possible for the NSQM to trigger an addition of a new UE to a S-NSSAI, for example, for a UE that was previously rejected due to a maximum quota being reached in the S-NSSAI. FIG. 11 is a communication flow diagram illustrating possible signaling that could be used in such a scenario, according to some embodiments. As shown, the communication flow may be performed between a UE 1102, a RAN 1104, an AMF 1106, a SMF 1108, a NRF 1110, and a NSQM 1112. In 1114, the NSQM 1112 may receive a deregistration request to remove a UE from a S-NS SAI. In 1116, the NSQM may decrement the quota for the S-NSSAI. In 1118, the NSQM may provide a UE addition request to the AMF 1106, indicating that there is quota availability for the S-NSSAI. In 1120, the AMF 1106 may send a UE addition response (acknowledgement) to the NSQM 1112. In 1122, the AMF 1106 may decide which UE (or UEs, if there is sufficient quota availability) to add to fill the quota for the S-NSSAI. Such a decision could be based on first-in-first-out (FIFO) logic, and/or based on any of various other possible considerations, as desired. In 1124, the AMF 1106 may provide a UE configuration update command with "allowed S-NSSAI" for the S-NSSAI to the selected UE(s)

1102. In 1126, the UE 1102 may provide a registration request (e.g., indicating a requested S-NSSAI) to the AMF 1106, via the RAN 1104. In 1128, the AMF 1106 may request a UE registration count for the requested S-NSSAI from the NSQM 1112, e.g., to determine whether there is available quota for registered UEs for that particular S-NSSAI. In 1130, the NSQM 1112 may check whether quota is available for registration of a new UE in the specified S-NSSAI. Due to the preceding deregistration, it may be the case that there is quota available for registration of a new UE in the specified S-NSSAI, and so in 1132, the NSQM 1112 may respond to the request for a UE registration count for the specified S-NSSAI with a success code for the S-NSSAI. In 1134, the AMF 1106 may respond to the registration request of the UE 1102 with a registration accept message, with the specified S-NSSAI added to the "Allowed S-NSSAI" list.

As another possible input or attribute that may be considered when determining to what size to scale a network slice, a number of sessions that can be simultaneously supported by a network slice could be defined. Accordingly, another possible key issue with respect to supporting network slicing may include determining how to support a certain quota on the (e.g., maximum) number of protocol data unit (PDU) sessions that can be concurrently established for a network slice (e.g., as defined by a S-NSSAI).

Figure 12:
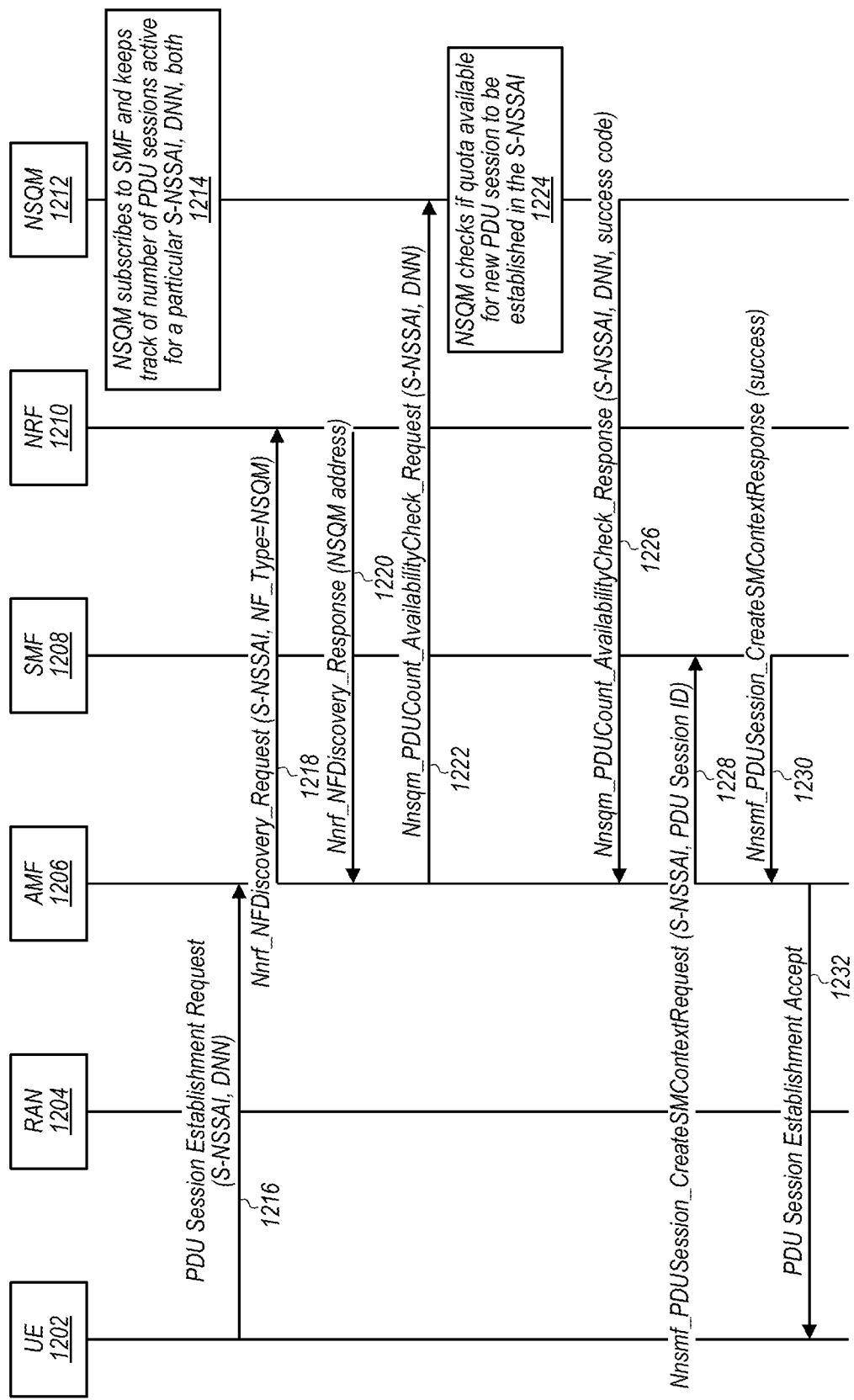
FIG. 12 is a communication flow diagram illustrating possible signaling that could be used in a successful PDU session establishment scenario when a quota on PDU sessions for a network slice is enforced by a network slice quota management function, according to some embodiments.

A NSQM function, such as described herein, could also, or alternatively, be deployed within a cellular network to maintain a count of the number of PDU sessions active for a network slice. The NSQM function could, for example, store information indicating the number of active PDU session (e.g., corresponding to PDU sessions with RRC connected UEs), and potentially also the number of dormant PDU sessions (e.g., corresponding to PDU sessions with RRC inactive or RRC idle UEs, or PDU sessions which have packet switched (PS) Data Off), and may provide various services to the other cellular network elements based at least in part on this information. As an example of such tracking and service provision, FIG. 12 is a communication flow diagram illustrating possible signaling that could be used in a successful PDU session establishment scenario when a quota on PDU sessions for a network slice is enforced by a network slice quota management function, according to some embodiments.

As shown, the communication flow may be performed between a UE 1202, a RAN 1204, an AMF 1206, a SMF 1208, a NRF 1210, and a NSQM 1212. In 1214, the NSQM 1212 may subscribe to the SMF 1208 and keep track of the number of PDU sessions active for a particular S-NSSAI, data network name (DNN), or both, for one or more S-NSSAIs and/or DNNs. In 1216, the UE 1202 may send a PDU session establishment request (e.g., indicating a S-NSSAI and DNN) to the AMF 1206, via the RAN 1204. In 1218, the AMF 1206 may send a network function discovery request to the NRF 1210 to request the address of the NSQM 1212 for the requested S-NSSAI. In 1220, the NRF 1210 may provide a network function discovery response to the AMF 1206, including the address of the NSQM 1212. In 1222, the AMF 1206 may request a PDU session count for the requested S-NSSAI from the NSQM 1212, e.g., to determine whether there is available quota for PDU sessions for that particular S-NSSAI and DNN. In 1224, the NSQM 1212 may check whether quota is available for a new PDU session to be established in the specified S-NSSAI. In the scenario of FIG. 12, it may be the case that there is quota available for a new PDU session to be established in the specified S-NSSAI, and so in 1226, the NSQM 1212 may respond to the request for a PDU session count for the specified S-NSSAI with a success code for the S-NSSAI and DNN. In 1228, the AMF 1206 may provide a request to create a PDU session to the SMF 1208, e.g., including the S-NSSAI and a PDU session ID. In 1230, the SMF 1208 may respond to the PDU session setup request, indicating that the PDU session has been successfully established. In 1232, the AMF 1206 may send a PDU session establishment accept message to the UE 1202. Note that the SMF 1206 may also inform the NSQM 1212 that a new PDU session has been established for the specified network slice.

Figure 13:
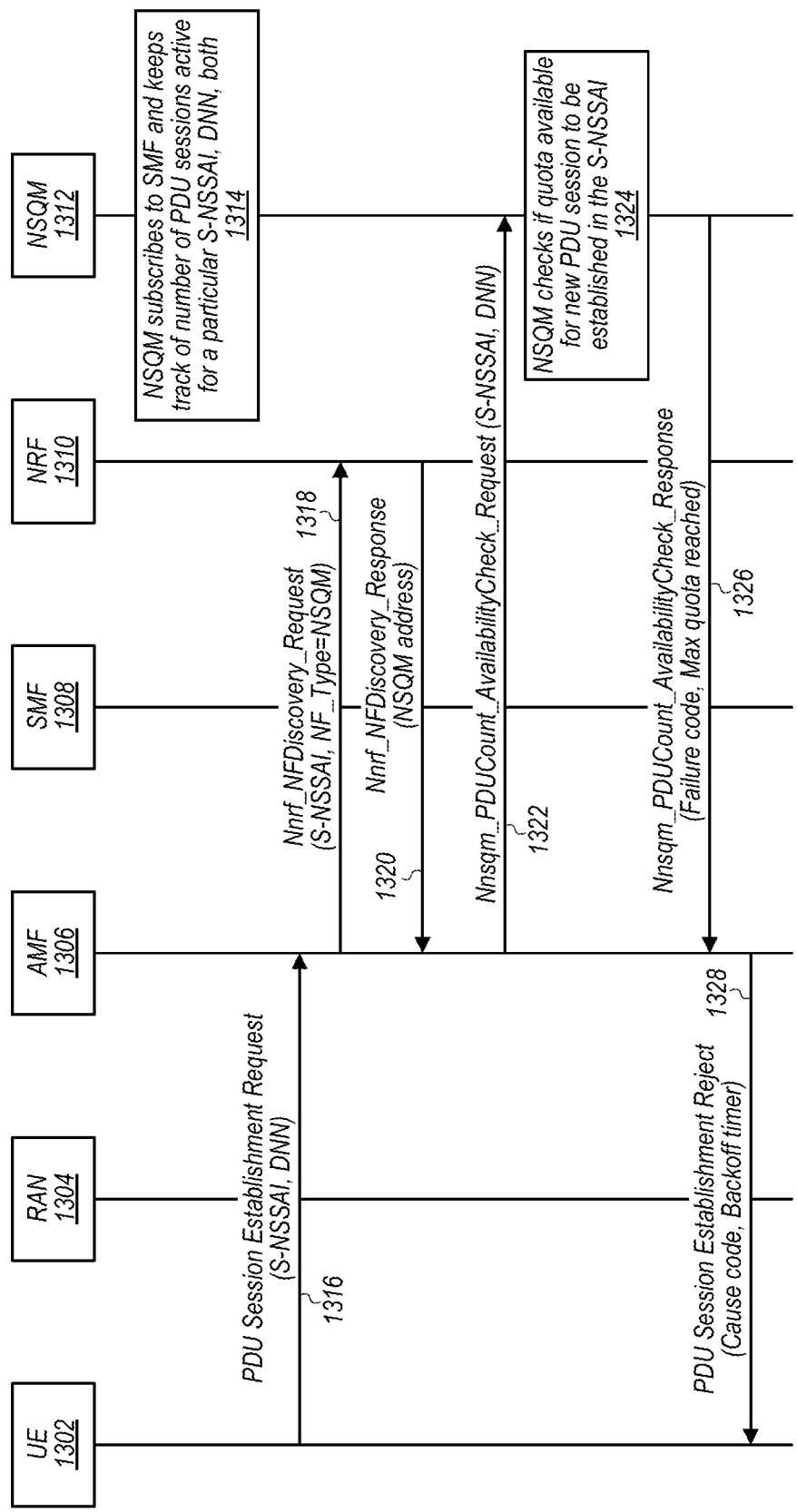
FIG. 13 is a communication flow diagram illustrating possible signaling that could be used in a rejected PDU session establishment scenario when a quota on PDU sessions for a network slice is enforced by a network slice quota management function, according to some embodiments.

As another example of such tracking and service provision, FIG. 13 is a communication flow diagram illustrating possible signaling that could be used in a rejected PDU session establishment scenario when a quota on PDU sessions for a network slice is enforced by a network slice quota management function, according to some embodiments. As shown, the communication flow may be performed between a UE 1302, a RAN 1304, an AMF 1306, a SMF 1308, a NRF 1310, and a NSQM 1312. In 1314, the NSQM 1312 may subscribe to the SMF 1308 and keep track of the number of PDU sessions active for a particular S-NSSAI, data network name (DNN), or both, for one or more S-NSSAIs and/or DNNs. In 1316, the UE 1302 may send a PDU session establishment request (e.g., indicating a S-NSSAI and DNN) to the AMF 1306, via the RAN 1304. In 1318, the AMF 1306 may send a network function discovery request to the NRF 1310 to request the address of the NSQM 1312 for the requested S-NSSAI. In 1320, the NRF 1310 may provide a network function discovery response to the AMF 1306, including the address of the NSQM 1312. In 1322, the AMF 1306 may request a PDU session count for the requested S-NSSAI from the NSQM 1312, e.g., to determine whether there is available quota for PDU sessions for that particular S-NSSAI and DNN. In 1324, the NSQM 1312 may check whether quota is available for a new PDU session to be established in the specified S-NSSAI. In the scenario of FIG. 13, it may be the case that there is not quota available for a new PDU session to be established in the specified S-NSSAI, and so in 1326, the NSQM 1312 may respond to the request for a PDU session count for the specified S-NSSAI with a failure code for the S-NSSAI and DNN, e.g., indicating that the maximum PDU session quota has been reached. In 1328, the AMF 1306 may send a PDU session establishment reject message to the UE 1302, e.g., including an appropriate cause code and possibly configuring a back-off timer.

Figure 14A:
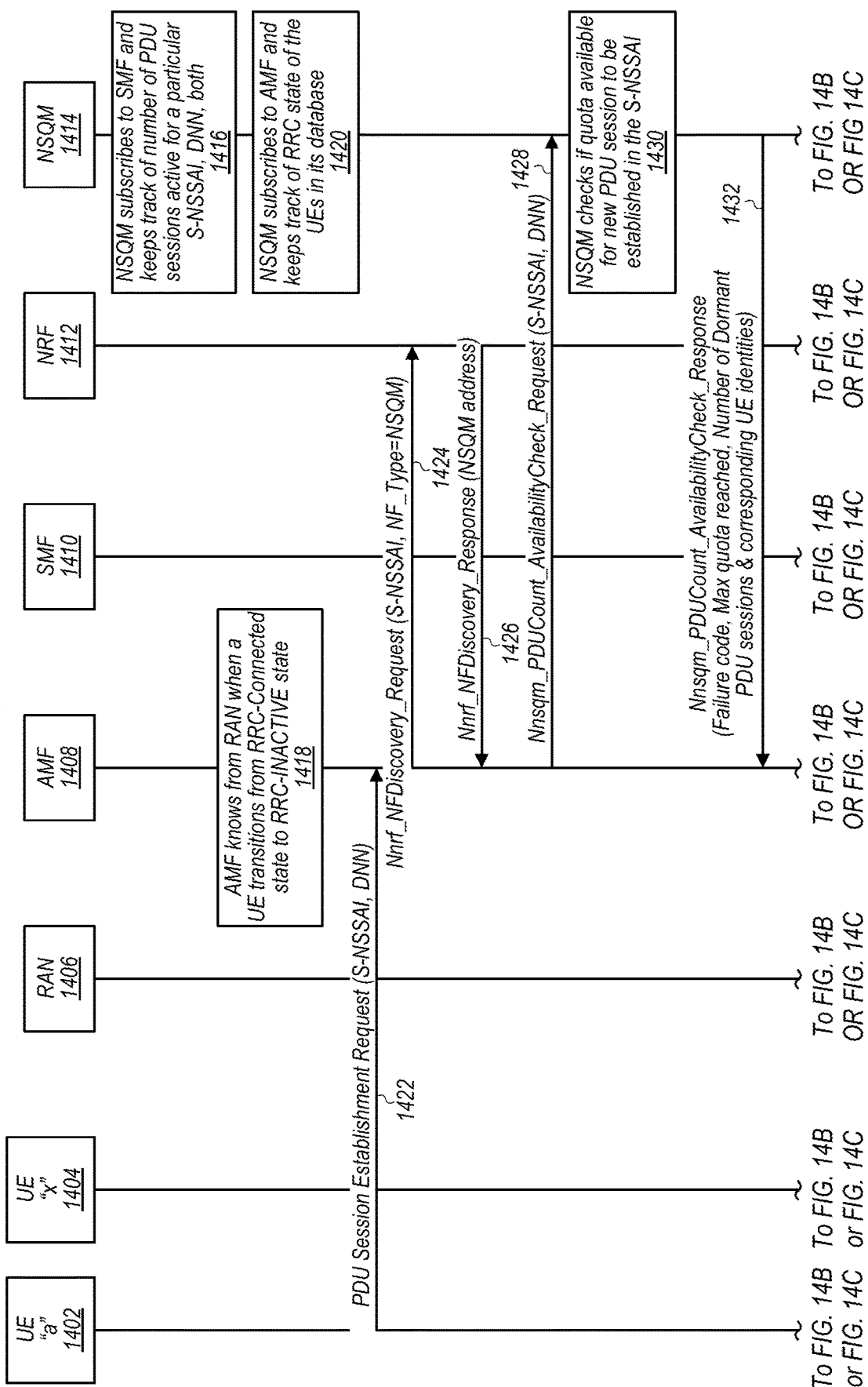
FIGS. 14A-14C are communication flow diagrams illustrating possible signaling that could be used in a scenario in which a dormant PDU session is released to allow a PDU session establishment when a quota on PDU sessions for a network slice is enforced by a network slice quota management function, according to some embodiments.
Figure 14B:
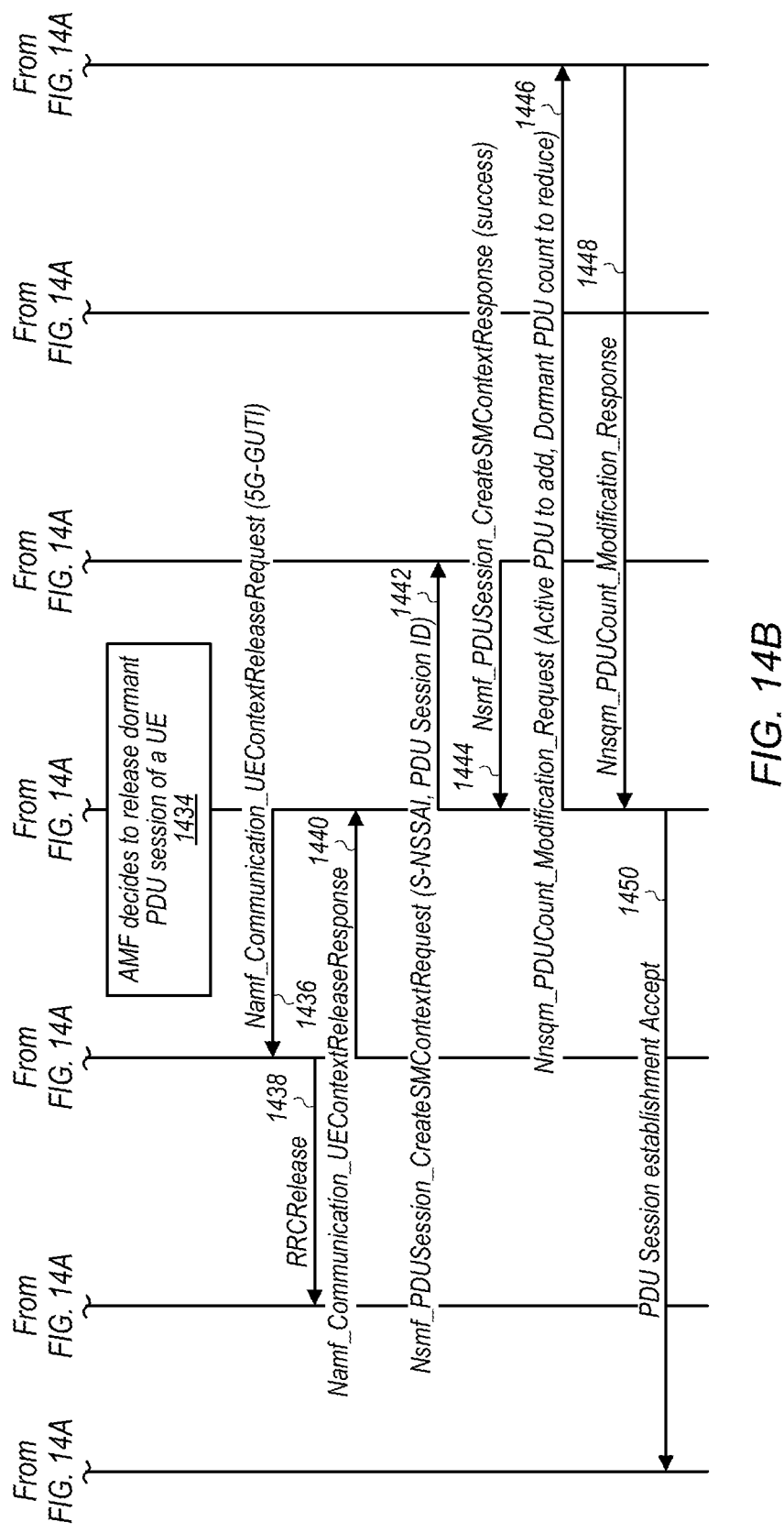
Figure 14C:
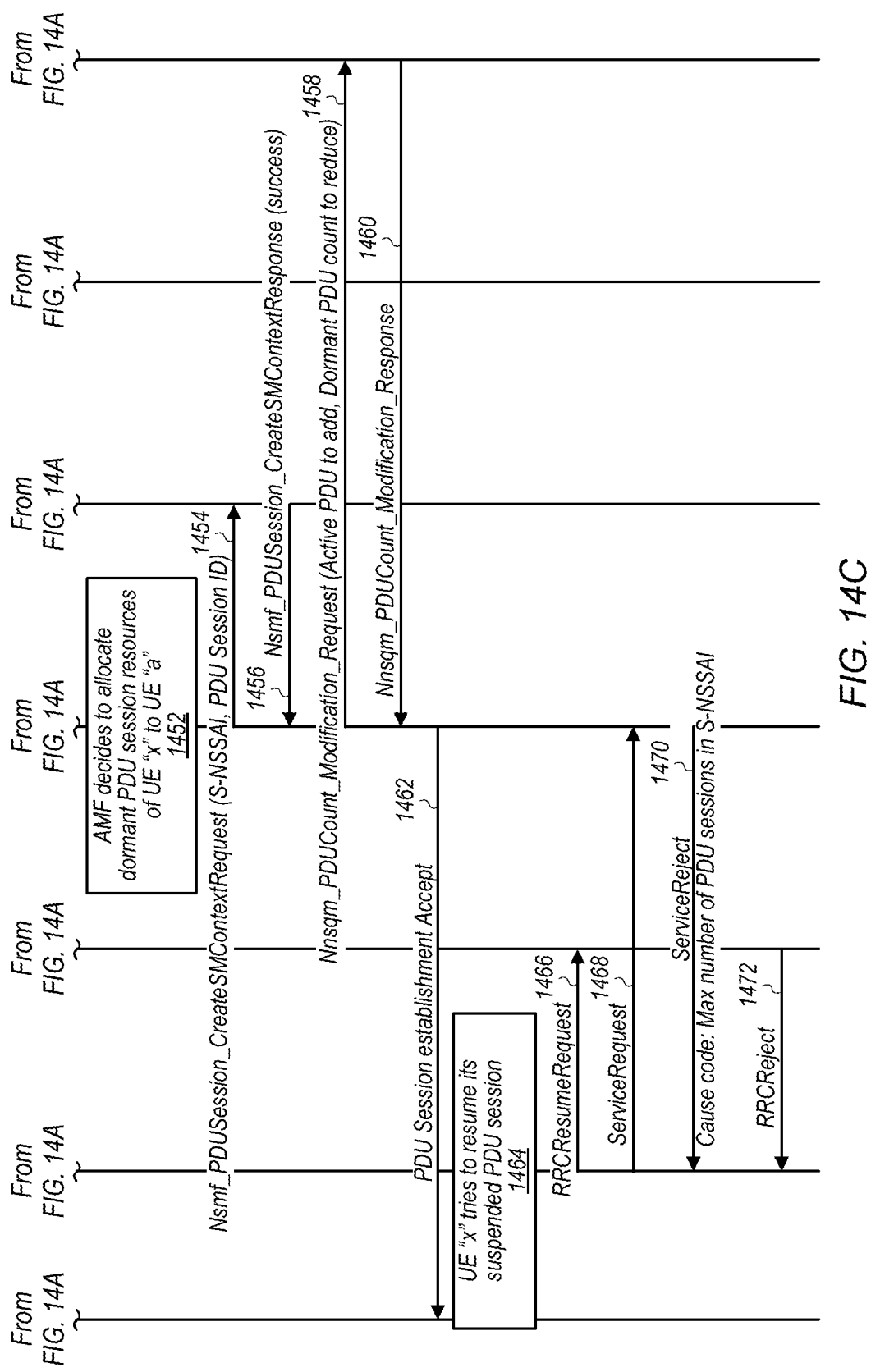

It may also be possible that a dormant PDU session could be released to allow a new PDU session to be established when there is no quota available for a new PDU session and there is at least one dormant PDU session for a S-NSSAI. FIGS. 14A-14C are communication flow diagrams illustrating possible signaling that could be used in such a scenario, according to some embodiments. As shown, the communication flows may be performed between a first UE (UE "a") 1402, a second UE (UE "x") 1404, a RAN 1406, an AMF 1408, a SMF 1410, a NRF 1412, and a NSQM 1414. In 1416, the NSQM 1414 may subscribe to the SMF 1410 and keep track of the number of PDU sessions active for a particular S-NSSAI, data network name (DNN), or both, for one or more S-NSSAIs and/or DNNs. In 1418, the AMF 1408 may know (e.g., from the RAN 1406) when a UE transitions from RRC connected to RRC inactive state. In 1420, the NSQM 1414 may further subscribe to the AMF 1408 and keep track of the RRC state of the UEs in its database. In 1422, the first UE 1402 may send a PDU session establishment request (e.g., indicating a S-NSSAI and DNN)

to the AMF 1408, via the RAN 1406. In 1424, the AMF 1408 may send a network function discovery request to the NRF 1412 to request the address of the NSQM 1414 for the requested S-NSSAI. In 1426, the NRF 1412 may provide a network function discovery response to the AMF 1408, including the address of the NSQM 1414. In 1428, the AMF 1408 may request a PDU session count for the requested S-NSSAI from the NSQM 1414, e.g., to determine whether there is available quota for PDU sessions for that particular S-NSSAI and DNN. In 1430, the NSQM 1414 may check whether quota is available for a new PDU session to be established in the specified S-NSSAI. In the scenario of FIG. 14, it may be the case that there is not quota available for a new PDU session to be established in the specified S-NSSAI, and so in 1432, the NSQM 1414 may respond to the request for a PDU session count for the specified S-NSSAI with a failure code for the S-NSSAI and DNN, e.g., indicating that the maximum PDU session quota has been reached, and also indicating the number of dormant PDU sessions and the corresponding UE identities for the dormant PDU sessions.

FIG. 14B illustrates one possible ("proactive") approach to releasing a dormant PDU session to allow a new PDU session to be established following the communication flow of FIG. 14A. As shown, in the illustrated scenario, in 1434, the AMF 1408 may decide to release a dormant PDU session of a UE (e.g., the second UE 1404). The AMF 1408 may determine which dormant PDU session to release in any of various possible ways, e.g., based on any of various possible considerations. For example, the dormant PDU session selected for release could be based on which PDU session has been dormant for a longest duration, whether a PDU session has a guaranteed bit rate (GBR) or non-GBR, whether the PDU session is for a ultra reliable low latency communication (URLLC) UE and/or network slice, subscription information for a UE associated with the PDU session, and/or any of various other possibilities. In 1436, the AMF 1408 may send a request to release the UE context for the second UE 1404 to the RAN 1406. In 1438, the RAN 1406 may send a RRC release message to the second UE 1404, and in 1440, may confirm to the AMF 1410 that the UE context for the second UE 1404 has been released. In 1442, the AMF 1408 may provide a request to create a PDU session to the SMF 1410, e.g., including the S-NSSAI and a PDU session ID. In 1444, the SMF 1410 may respond to the PDU session setup request, indicating that the PDU session has been successfully established. In 1446, the AMF 1408 may provide a PDU count modification request to the NSQM 1414, e.g., indicating to add one to the active PDU session and reduce the dormant PDU session count by one. In 1448, the NSQM 1414 may send a PDU count modification response to the AMF 1408, e.g., confirming the modification. In 1450, the AMF 1408 may send a PDU session establishment accept message to the first UE 1402.

FIG. 14C illustrates another possible ("deferred") approach to releasing a dormant PDU session to allow a new PDU session to be established following the communication flow of FIG. 14A, e.g., as an alternative to the communication flow of FIG. 14B. As shown, in the illustrated scenario, in 1452, the AMF 1408 may decide to reallocate the dormant PDU session resources of the second UE 1404 to the first UE 1402. The AMF 1408 may determine which dormant PDU session to release in any of various possible ways, e.g., based on any of various possible considerations. For example, the dormant PDU session selected for release could be based on which PDU session has been dormant for a longest duration, whether a PDU session has a GBR or non-GBR, whether the PDU session is for a URLLC UE and/or network slice, subscription information for a UE associated with the PDU session, and/or any of various other possibilities. In 1454, the AMF 1408 may provide a request to create a PDU session to the SMF 1410, e.g., including the S-NSSAI and a PDU session ID. In 1456, the SMF 1410 may respond to the PDU session setup request, indicating that the PDU session has been successfully established. In 1458, the AMF 1408 may provide a PDU count modification request to the NSQM 1414, e.g., indicating to add one to the active PDU session and reduce the dormant PDU session count by one. In 1460, the NSQM 1414 may send a PDU count modification response to the AMF 1408, e.g., confirming the modification. In 1462, the AMF 1408 may send a PDU session establishment accept message to the first UE 1402. In 1464, the second UE 1404 may attempt to resume its suspended PDU session. In 1466, the second UE 1404 may send a RRC resume request to the RAN 1406, and in 1468, may send a service request to the AMF 1408. In 1470, since there may not be any available quota for PDU sessions for the S-NSSAI, the AMF 1408 may send a service reject message to the second UE 1404 with the corresponding cause code. In 1472, the RAN may provide a RRC reject message to the second UE 1404.

Figure 15:
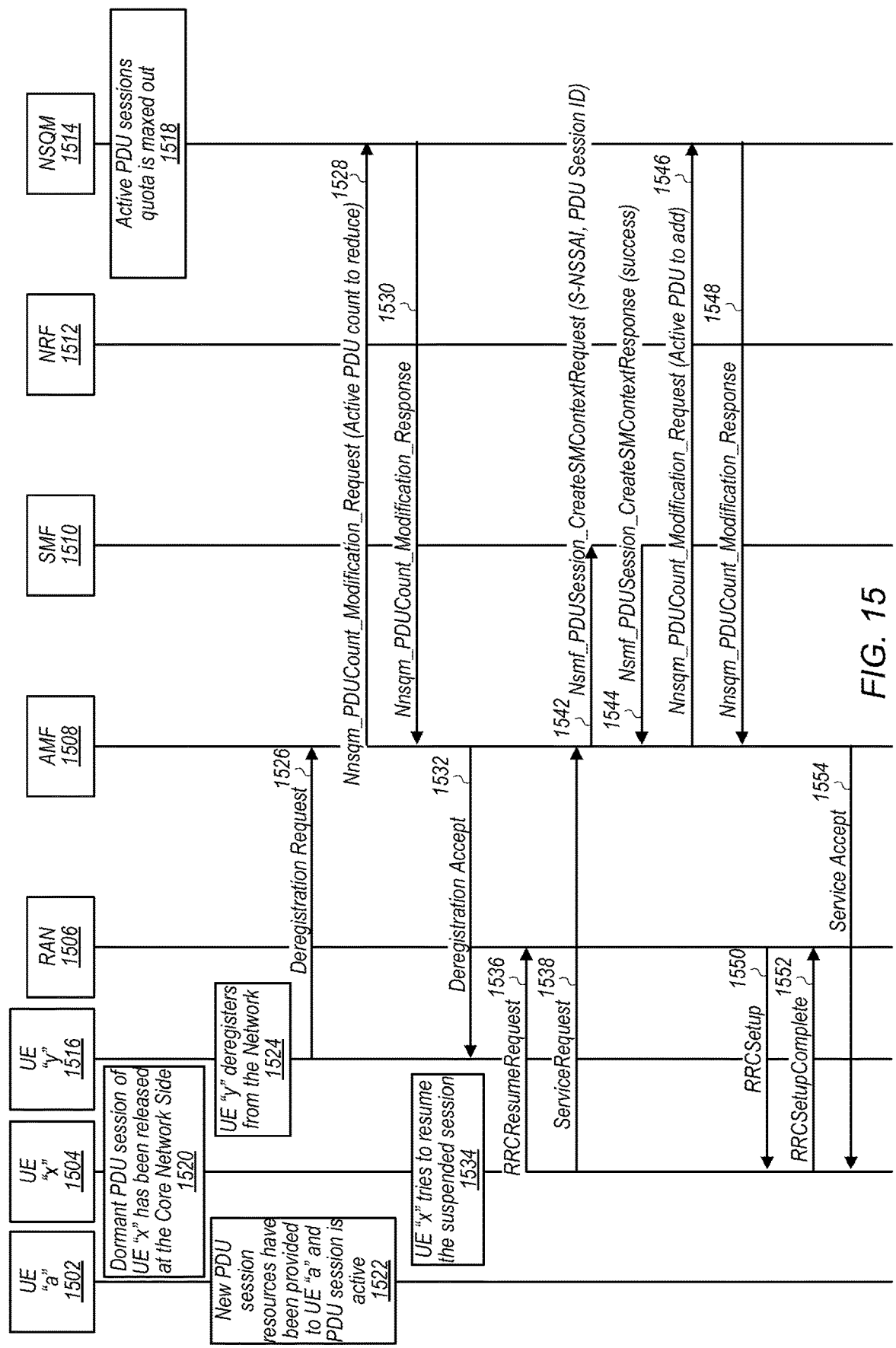
FIG. 15 is a communication flow diagram illustrating further possible signaling that could be used in a scenario in which a dormant PDU session is released to allow a PDU session establishment when a quota on PDU sessions for a network slice is enforced by a network slice quota management function, according to some embodiments.

FIG. 15 is a communication flow diagram illustrating further possible signaling that could be used in a scenario in which a dormant PDU session is released to allow a PDU session establishment when a quota on PDU sessions for a network slice is enforced by a network slice quota management function, according to some embodiments. In particular, FIG. 15 illustrates communication flow in a possible scenario in which another UE deregisters between a dormant PDU session being released and the UE with that dormant PDU session attempting to resume the suspended session, which may in turn allow the UE with the dormant PDU session that was released being able to reestablish the released dormant PDU session. This may potentially result in a smaller overall impact to the UE with the released dormant PDU session than the "proactive" approach, at least in some instances.

As shown, the communication flow may be performed between a first UE (UE "a") 1502, a second UE (UE "x") 1504, a RAN 1506, an AMF 1508, a SMF 1510, a NRF 1512, a NSQM 1514, and a third UE (UE "y") 1516. In 1518, the active PDU sessions quota may be maxed out at the NSQM 1514. In 1520, a dormant PDU session of the second UE 1504 may have been released at the core network side, e.g., without informing the second UE 1504 that its PDU session has been released. In 1522, new PDU session resources (e.g., that were made available by the release of the PDU session of the second UE 1504) may have been provided to the first UE 1502, which may have an active PDU session. IN 1524, the third UE 1516 may deregister from the network. This may include, in 1526, sending a deregistration request to the AMF 1508. In 1528, the AMF 1508 may provide a PDU count modification request to the NSQM 1514, e.g., indicating to reduce the active PDU session count by one. In 1530, the NSQM 1514 may send a PDU count modification response to the AMF 1508, e.g., confirming the modification. In 1532, the AMF 1508 may send a deregistration accept message to the third UE 1516. In 1534, the second UE 1504 may attempt to resume its suspended PDU session. This may include in 1536, sending a RRC resume request to the RAN 1506, and in 1538, sending a service request to the AMF 1508. In 1542, the AMF 1508 may provide a request to create a PDU session to the SMF 1510, e.g., including the S-NSSAI and a PDU session ID. In 1544, the SMF 1510 may respond to the PDU session setup request, indicating that the PDU session has been successfully established. In 1546, the AMF 1508 may provide a PDU count modification request to the NSQM 1514, e.g., indicating to add one to the active PDU session. In 1548, the NSQM 1514 may send a PDU count modification response to the AMF 1508, e.g., confirming the modification. In 1550, the RAN 1506 may provide a RRC setup message to the second UE 1504. Note that the RAN 1506 may send the RRC setup message (e.g., instead of an RRC Resume message) at least in part because the dormant PDU session of the second UE 1504 was released at the core network in 1520. In 1552, the second UE 1504 may provide a RRC setup complete message to the RAN 1506. In 1554, the AMF 1508 may send a service accept message to the second UE 1504. Following the communication flow of FIG. 15, it may be the case that both the first UE 1402 and the second UE 1404 have an active PDU session ongoing.

Thus, a NSQM function may be used in a cellular network to provide quota management for one or more network slices with respect to the number of registered and deregistered UEs, and/or with respect to the number of active and dormant PDU sessions. FIG. 16 is a table illustrating possible services that could be provided by such a network slice quota management function, according to some embodiments. The illustrated services may include a NSQM registration count service, whose service operations may include subscribe, unsubscribe, and notify operations, as well as UECheck, UEAddition, and UERemoval operations. The illustrated services may also include a NSQM PDU count service, whose service operations may include subscribe, unsubscribe, and notify operations, as well as AvailabilityCheck and Modification operations. The AMF and the NSSF may be consumers of such services, at least according to some embodiments.

In conjunction with deployment of such a NSQM function, it may be the case that a new AMF service is provided, e.g., to further support quota management in a cellular core network. FIG. 17 is a table illustrating such a possible service that could be provided by an AMF in conjunction with use of a NSQM function in a cellular network, according to some embodiments. As shown, the illustrated service may include an AMF communication service, whose service operations may include a UEContextRelease operation, with the NG-RAN as the potential consumer of such a service, at least according to some embodiments. Such a service may be used to release the UE context of a UE for which the AMF has decided to release a dormant PDU session, e.g., in order to allow a new active PDU session to be established, at least according to some embodiments. Note that this service may be provided by the AMF in addition to various other existing services provided by the AMF, at least according to some embodiments.

In the following further exemplary embodiments are provided.

One set of embodiments may include a cellular network element, comprising: a network port; and a processor coupled to the network port; wherein the cellular network element is configured to: store capacity information for at least a first network slice; receive a request for an indication of whether the first network slice has additional capacity; and provide an indication of whether the first network slice has additional capacity in response to the request.

According to some embodiments, the capacity information for the first network slice includes at least: a current number of wireless devices registered for the first network slice; and a number of wireless devices allowed to be registered for the first network slice.

According to some embodiments, the cellular network element is further configured to: receive an indication that a wireless device has registered for the first network slice; determine whether the wireless device is counted in the current number of wireless devices registered for the first network slice; and increment the capacity information indicating the current number of wireless devices registered for the first network slice based at least in part on the indication that a wireless device has registered for the first network slice, if the wireless device is not yet counted in the current number of wireless devices registered for the first network slice.

According to some embodiments, the cellular network element is further configured to: receive an indication that a wireless device has deregistered for the first network slice; and decrement the capacity information indicating the current number of wireless devices registered for the first network slice based at least in part on the indication that a wireless device has deregistered for the first network slice.

According to some embodiments, the capacity information for the first network slice includes at least: a current number of active packet sessions established with the first network slice; a current number of dormant packet sessions established with the first network slice; and a number of packet sessions allowed to be established with the first network slice.

According to some embodiments, the cellular network element is further configured to: receive an indication that an active packet session with the first network slice has been established; determine whether the active packet session is counted in the current number of active packet sessions established with the first network slice; and increment the capacity information indicating the current number of active packet sessions established with the first network slice based at least in part on the indication that an active packet session with the first network slice has been established, if the active packet session is not yet counted in the current number of active packet sessions established with the first network slice.

According to some embodiments, the cellular network element is further configured to: receive an indication that an active packet session with the first network slice has been released; and decrement the capacity information indicating the current number of active packet sessions established with the first network slice based at least in part on the indication that an active packet session with the first network slice has been released.

According to some embodiments, the cellular network element is further configured to: store capacity information for a plurality of network slices.

Another set of embodiments may include an apparatus, comprising: a processor configured to cause a cellular network element to: store capacity information for a plurality of network slices; receive a request for an indication of whether a first network slice has additional capacity; and provide an indication of whether the first network slice has additional capacity in response to the request.

According to some embodiments, the request for an indication of whether the network slice has additional capacity comprises one or more of: a request for an indication of whether the network slice has capacity for an additional wireless device to register with the network slice; or a request for an indication of whether the network slice has capacity for an additional packet session to be established with the network slice.

According to some embodiments, the capacity information for each respective network slice of the plurality of network slices includes one or more of: a current number of wireless devices registered for the respective network slice; a number of wireless devices allowed to be registered for the respective network slice; a current number of packet sessions established with the respective network slice; a current number of active packet sessions established with the respective network slice; a current number of dormant packet sessions established with the respective network slice; or a number of packet sessions allowed to be established with the respective network slice.

According to some embodiments, the processor is further configured to cause the cellular network element to: receive an indication to modify the capacity information for a network slice; and modify the capacity information for the network slice based at least in part on the indication to modify the capacity information for the network slice.

According to some embodiments, the indication to modify the capacity information for the network slice includes one or more of: an indication to modify a registered wireless devices count for the network slice; an indication to modify an active packet session count for the network slice; or an indication to modify a dormant packet session count for the network slice.

Yet another set of embodiments may include a cellular network element, comprising: a network port; and a processor coupled to the network port; wherein the cellular network element is configured to: provide a request for an indication of whether a network slice has additional capacity, wherein the request is provided to a network slice quota management (NSQM) function; and receive an indication of whether the network slice has additional capacity in response to the request, wherein the indication is received from the NSQM function.

According to some embodiments, the request for an indication of whether the network slice has additional capacity comprises a request for an indication of whether the network slice has capacity for an additional wireless device to register with the network slice.

According to some embodiments, the request for an indication of whether the network slice has additional capacity comprises a request for an indication of whether the network slice has capacity for an additional packet session to be established with the network slice.

According to some embodiments, the cellular network element is further configured to: receive a request from a wireless device to register with the network slice or to establish a packet session with the network slice, wherein the request for an indication of whether the network slice has additional capacity is provided based at least in part on the request from the wireless device to register with the network slice or to establish a packet session with the network slice.

According to some embodiments, the indication of whether the network slice has additional capacity indicates that the network slice does not have additional capacity, wherein the cellular network element is further configured to: reject the request from the wireless device to register with the network slice or to establish a packet session with the network slice based at least in part on the indication of whether the network slice has additional capacity; and provide a cause code indicating that the network slice does not have additional capacity to the wireless device based at least in part on the indication of whether the network slice has additional capacity.

According to some embodiments, the cellular network element is further configured to: configure a backoff timer for the wireless device for one or more of registering with the network slice or establishing a packet session with the network slice.

According to some embodiments, the request from the wireless device comprises a request to register with the network slice, wherein the cellular network element is further configured to: receive, at a later time, an indication that the network slice has additional capacity for a wireless device to register with the network slice; select the wireless device to register with the network slice based at least in part on the indication that the network slice has additional capacity for a wireless device to register with the network slice; and provide an indication to the wireless device that the wireless device is allowed to register with the network slice.

According to some embodiments, the indication of whether the network slice has additional capacity indicates that the network slice has additional capacity, wherein the cellular network element is further configured to: accept the request from the wireless device to register with the network slice or to establish a packet session with the network slice based at least in part on the indication of whether the network slice has additional capacity; and provide indication to modify capacity information for the network slice to the NSQM function based at least in part on accepting the request from the wireless device to register with the network slice or to establish a packet session with the network slice.

According to some embodiments, the cellular network element is further configured to: receive a request from a wireless device to establish a packet session with the network slice, wherein the indication of whether the network slice has additional capacity indicates that the network slice does not have capacity for an additional packet session to be established with the network slice, wherein the indication of whether the network slice has additional capacity further indicates a number of dormant packet sessions for the network slice; release a dormant packet session with the network slice based at least in part on the request from the wireless device to establish a packet session with the network slice and the indication that the network slice does not have capacity for an additional packet session to be established with the network slice; and accept the request from the wireless device to establish a packet session with the network slice based at least in part on releasing the dormant packet session with the network slice.

According to some embodiments, the cellular network element is further configured to: notify a wireless device associated with the dormant packet session that the dormant packet session has been released in response to releasing the dormant packet session.

According to some embodiments, a wireless device associated with the dormant packet session is not notified that the dormant packet session has been released.

According to some embodiments, the cellular network element is further configured to: provide a request for an address of the NSQM function to a network function repository function (NRF); and receive an indication of the address of the NSQM function from the NRF.

Yet another exemplary embodiment may include a method, comprising: by a device: performing any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cellular network function,
wherein the cellular network function is configured to:
store capacity information for at least a first network slice, wherein the capacity information for the first network slice includes at least:
a count of wireless devices registered for the first network slice; and
a number of wireless devices allowed to be registered for the first network slice;
receive, from an access and mobility function (AMF) in response to a registration of at least a first wireless device for the first network slice, a request for an indication of whether the first network slice has capacity for an additional wireless device to register with the first network slice; and
determine whether the first wireless device is already counted in the count, and determine whether to modify the count based at least in part on whether the first wireless device is already counted in the count, wherein:
when the first wireless device is already counted in the count, do not increment the count; and
when the wireless device is not already counted in the count and the count is less than the number of wireless devices allowed to be registered for the first network slice, increment the count;
and
provide an indication of whether the first network slice has capacity for the first wireless device to register in response to the request.

2. The cellular network function of claim 1, wherein the cellular network function is further configured to:
receive an indication that a wireless device has deregistered for the first network slice; and
decrement the capacity information indicating the current number of wireless devices registered for the first network slice based at least in part on the indication that a wireless device has deregistered for the first network slice.

3. The cellular network function of claim 1, wherein the capacity information for the first network slice includes at least:
a current number of active packet sessions established with the first network slice;
a current number of dormant packet sessions established with the first network slice; and
a number of packet sessions allowed to be established with the first network slice.

4. The cellular network function of claim 3, wherein the cellular network function is further configured to:
receive an indication that an active packet session with the first network slice has been established;
determine whether the active packet session is counted in the current number of active packet sessions established with the first network slice; and
increment the capacity information indicating the current number of active packet sessions established with the first network slice based at least in part on the indication that an active packet session with the first network slice has been established, if the active packet session is not yet counted in the current number of active packet sessions established with the first network slice.

5. The cellular network function of claim 3, wherein the cellular network function is further configured to:
receive an indication that an active packet session with the first network slice has been released; and
decrement the capacity information indicating the current number of active packet sessions established with the first network slice based at least in part on the indication that an active packet session with the first network slice has been released.

6. The cellular network function of claim 1, wherein the cellular network function is further configured to:
store capacity information for a plurality of network slices.

7. The cellular network function of claim 1, wherein the cellular network function is further configured to:
receive an indication to modify the capacity information for the first network slice; and modify the capacity information for the first network slice based at least in part on the indication to modify the capacity information for the first network slice.

8. An apparatus, comprising:
a processor configured to cause a cellular network function to:
store capacity information for at least a first network slice, wherein the capacity information for the first network slice includes at least:
 a count of wireless devices registered for the first network slice; and
 a number of wireless devices allowed to be registered for the first network slice;
receive, from an access and mobility function (AMF) in response to a registration of at least a first wireless device for the first network slice, a request for an indication of whether the first network slice has capacity for an additional wireless device to register with the first network slice; and
determine whether the first wireless device is already counted in the count, and determine whether to modify the count based at least in part on whether the first wireless device is already counted in the count, wherein:
 when the first wireless device is already counted in the count, do not increment the count; and
 when the wireless device is not already counted in the count and the count is less than the number of wireless devices allowed to be registered for the first network slice, increment the count;
and
provide an indication of whether the first network slice has capacity for the first wireless device to register in response to the request.

9. The apparatus of claim 8, wherein the processor is further configured to cause the cellular network function to:
receive a request for an indication of whether the network slice has capacity for an additional packet session to be established with the first network slice.

10. The apparatus of claim 8, wherein the capacity information for the first network slice further includes one or more of:
a current number of packet sessions established with the first network slice;
a current number of active packet sessions established with the first network slice;
a current number of dormant packet sessions established with the first network slice; or
a number of packet sessions allowed to be established with the first network slice.

11. The apparatus of claim 8, wherein the processor is further configured to cause the cellular network function to:
receive an indication to modify the capacity information for the first network slice; and
modify the capacity information for the first network slice based at least in part on the indication to modify the capacity information for the first network slice.

12. The apparatus of claim 11, wherein the indication to modify the capacity information for the first network slice includes one or more of:
an indication to modify a registered wireless devices count for the first network slice;
an indication to modify an active packet session count for the first network slice; or
an indication to modify a dormant packet session count for the first network slice.

13. The apparatus of claim 8, wherein the processor is further configured to cause the cellular network function to:
store capacity information for a plurality of network slices.

14. A method for operating a cellular network function, the method comprising:
storing capacity information for at least a first network slice, wherein the capacity information for the first network slice includes at least:
 a count of wireless devices registered for the first network slice; and
 a number of wireless devices allowed to be registered for the first network slice;
receiving, from an access and mobility function (AMF) in response to a registration of at least a first wireless device for the first network slice, a request for an indication of whether the first network slice has capacity for an additional wireless device to register with the first network slice; and
determining whether the first wireless device is already counted in the count, and determining whether to modify the count based at least in part on whether the first wireless device is already counted in the count, wherein:
 when the first wireless device is already counted in the count, do not increment the count; and
 when the wireless device is not already counted in the count and the count is less than the number of wireless devices allowed to be registered for the first network slice, increment the count; and
providing an indication of whether the first network slice has capacity for the first wireless device to register in response to the request.

15. The method of claim 14, further comprising:
receiving an indication that a wireless device has deregistered for the first network slice; and
decrementing the capacity information indicating the current number of wireless devices registered for the first network slice based at least in part on the indication that a wireless device has deregistered for the first network slice.

16. The method of claim 14, wherein the capacity information for the first network slice includes at least:
a current number of active packet sessions established with the first network slice;
a current number of dormant packet sessions established with the first network slice; and
a number of packet sessions allowed to be established with the first network slice.

17. The method of claim 16, further comprising:
receiving an indication that an active packet session with the first network slice has been established;
determining whether the active packet session is counted in the current number of active packet sessions established with the first network slice; and
incrementing the capacity information indicating the current number of active packet sessions established with the first network slice based at least in part on the indication that an active packet session with the first network slice has been established, if the active packet session is not yet counted in the current number of active packet sessions established with the first network slice.

18. The method of claim 16, further comprising:
receiving an indication that an active packet session with the first network slice has been released; and decrementing the capacity information indicating the current number of active packet sessions established with the first network slice based at least in part on the indication that an active packet session with the first network slice has been released.

19. The method of claim 14, further comprising:
storing capacity information for a plurality of network slices.

20. The method of claim 14, further comprising:
receiving an indication to modify the capacity information for the first network slice; and
modifying the capacity information for the first network slice based at least in part on the indication to modify the capacity information for the first network slice.

* * * * *